US009148673B2

(12) United States Patent
Kim et al.

(10) Patent No.: US 9,148,673 B2
(45) Date of Patent: Sep. 29, 2015

(54) DEPTH MAP CODING

(75) Inventors: Woo-Shik Kim, Los Angeles, CA (US); Po-Lin Lai, Princeton, NJ (US); Dong Tian, Plainsboro, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 881 days.

(21) Appl. No.: 13/379,771

(22) PCT Filed: Feb. 9, 2010

(86) PCT No.: PCT/US2010/000355
§ 371 (c)(1),
(2), (4) Date: Dec. 21, 2011

(87) PCT Pub. No.: WO2010/151279
PCT Pub. Date: Dec. 29, 2010

(65) Prior Publication Data
US 2012/0140819 A1 Jun. 7, 2012

Related U.S. Application Data

(60) Provisional application No. 61/269,501, filed on Jun. 25, 2009, provisional application No. 61/283,752, filed on Dec. 8, 2009.

(51) Int. Cl.
H04B 1/66 (2006.01)
H04N 7/12 (2006.01)
(Continued)

(52) U.S. Cl.
CPC ............... *H04N 19/86* (2014.11); *G06T 15/00* (2013.01); *H04N 13/0018* (2013.01);
(Continued)

(58) Field of Classification Search
None
See application file for complete search history.

(56) References Cited

U.S. PATENT DOCUMENTS 5,633,682 A 5/1997 Tahara
2004/0104935 A1 6/2004 Williamson et al.
(Continued)

FOREIGN PATENT DOCUMENTS

CN 101309412 11/2008
CN 101374242 2/2009
(Continued)

OTHER PUBLICATIONS

Maitre et al., "Rate Distortion Optimal Depth Maps in the Wavelet Domain for Free-Viewpoint Rendering", ICIP 2007, 2007.
(Continued)

*Primary Examiner* — Anner Holder
*Assistant Examiner* — Ellyar Y Barazesh
(74) *Attorney, Agent, or Firm* — Robert D. Shedd; Brian J. Cromarty

(57) ABSTRACT

Various implementations relate to depth map coding. In one method, a depth coding rate and depth distortion are determined for a coding mode. Based on the value of depth distortion, a correlation coefficient is determined between at least a portion of a video picture and a translated version of the video picture. The video picture is one or more of a video picture corresponding to the depth being coded, or a rendered video picture for a different view. A video distortion is determined based on the correlation coefficient, and is used to evaluate the coding mode. Another implementation determines a multiplier, to be used in a rate-distortion cost, based on pixel values from one or more of a video picture from a particular view or a rendered video picture for a different view.

26 Claims, 18 Drawing Sheets

(51) Int. Cl.
| | |
|---|---|
| H04N 11/02 | (2006.01) |
| H04N 11/04 | (2006.01) |
| H04N 7/18 | (2006.01) |
| G06T 15/00 | (2011.01) |
| G06K 9/00 | (2006.01) |
| H04N 19/86 | (2014.01) |
| H04N 19/50 | (2014.01) |
| H04N 13/00 | (2006.01) |
| H04N 19/176 | (2014.01) |
| H04N 19/597 | (2014.01) |
| H04N 19/103 | (2014.01) |
| H04N 19/136 | (2014.01) |
| H04N 19/19 | (2014.01) |

(52) U.S. Cl.
CPC ...... *H04N 13/0022* (2013.01); *H04N 13/0025* (2013.01); *H04N 13/0048* (2013.01); *H04N 19/103* (2014.11); *H04N 19/136* (2014.11); *H04N 19/176* (2014.11); *H04N 19/19* (2014.11); *H04N 19/50* (2014.11); *H04N 19/597* (2014.11); *H04N 2013/0081* (2013.01); *H04N 2013/0092* (2013.01)

(56) References Cited

U.S. PATENT DOCUMENTS

| | | | |
|---|---|---|---|
| 2005/0244071 | A1 | 11/2005 | Zaharia et al. |
| 2007/0024614 | A1* | 2/2007 | Tam et al. ............... 345/419 |
| 2007/0030356 | A1 | 2/2007 | Yea et al. |
| 2007/0109409 | A1* | 5/2007 | Yea et al. ............... 348/153 |
| 2007/0121722 | A1 | 5/2007 | Martinian et al. |
| 2007/0274396 | A1 | 11/2007 | Zhang et al. |
| 2008/0198920 | A1* | 8/2008 | Yang et al. ............... 375/240.01 |
| 2008/0247462 | A1 | 10/2008 | Demos |
| 2009/0010507 | A1 | 1/2009 | Geng |
| 2009/0129667 | A1 | 5/2009 | Ho et al. |
| 2011/0007135 | A1 | 1/2011 | Okada et al. |
| 2012/0140819 | A1 | 6/2012 | Kim et al. |

FOREIGN PATENT DOCUMENTS

| | | |
|---|---|---|
| CN | 101516040 | 8/2009 |
| EP | 1591963 | 11/2005 |
| KR | 100795974 | 1/2008 |
| WO | WO2008071037 | 6/2008 |

OTHER PUBLICATIONS

Morvan et al., "Joint Depth/Texture Bit-Allocation for Multi-View Video Compression", Eindhoven, Netherlands.

Cernigliaro et al., "Fast Mode Decision for Multiview Video Coding Based on Depth Maps", Visual Communications and Image Processing 2009. Proceedings of SPIE-IS&T Electronic Image SPIE, vol. 7257, 2009.

Penta et al., "Compression of Multiple Depth Maps for IBR", Center for Visual Information Technology, Visual Computer 2005, Sep. 1, 2005, pp. 611-618.

Oh et al., "H.264-Based Depth Map Sequence Coding Using Motion Information of Corresponding Texture Video", PSIVT 2006, LNCS 4319, Berlin Heidelberg 2006, pp. 898-907. Oh et al., H.264-Based Depth Map Sequence Coding Using Motion Information of Corresponding Texture.

Sullivan et al., "Rate-Distortion Optimization for Video Compression", IEEE Signal Processing Magazine, Nov. 1998, pp. 74-90.

Calderero et al., "Multiple View Region Matching as a Lagrangian Optimization Problem", ICASSP 2007, IEEE, 2007.

Lai et al., "Improving View Rendering Quality and Coding Efficiency by Suppressing Compression Artifacts in Depth-Image Coding".

Ortega et al., "Rate-Distortion Methods for Image and Video Compression", IEEE Signal Processing Magazine, 1998.

Ramanathan et al., "Rate-Distortion Analysis for Light Field Coding and Streaming", Elsevier Science, Mar. 1, 2006.

Nguyen et al., "Error Analysis for Image-Based Rendering with Depth Information", IEEE Transactions on Image Processing, vol. 18, No. 4, Apr. 2009.

Morvan et al., "The Effect of Depth Compression on Multiview Rendering Quality", 3DTV-CON'08, 2006 IEEE, Istanbul, Turkey, May 28-30, 2008.

Kim et al., Depth Map Coding with Distortion Estimation of Rendered View, (V2).

Kim et al., "Depth Map Coding with Distortion Estimation of Rendered View", (V4).

Kim et al., "Depth Map Coding with Distortion Estimation of Rendered View", (V6).

Yea et al., "RD-Optimized View Synthesis Prediction for Multiview Video Coding", 2007, IEEE.

Yang et al., "Optimal Subband Filter Banks for Multiple Description Coding", IEEE Transactions on Information Theory, vol. 46, No. 7, Nov. 2000, pp. 2477-2490.

Klimaszewski et al., "Distortions of Synthesized Views Caused by Compression of Views and Depth Maps".

Yea et al., "View Synthesis Prediction of Multiview Video Coding", Signal Processing: Image Communication 24, 2009, pp. 89-100.

Ekmekcioglu et al., "A Temporal Subsampling Approach for Multiview Depth Map Compression", IEEE Transactions on Circuits and Systems for Video Technology, vol. 19, No. 8, Aug. 2009, pp. 1209-1213.

Search Report Dated Jul. 16, 2010.

PCT/US2010/000355, "International Preliminary Report on Patentability," Jan. 4, 2012.

* cited by examiner

DEPTH MAP CODING

CROSS-REFERENCE TO RELATED APPLICATIONS

This application claims the benefit, under 35 U.S.C. §365 of International Application PCT/US2010/000355, filed Feb. 9, 2010, which was published in accordance with PCT Article 21(2) on Dec. 29, 2010 in English and which claims the benefit of U.S. provisional patent application No. 61/269,501, filed Jun. 25, 2009 and U.S. provisional patent application No. 61/283,752, filed Dec. 8, 2009.

TECHNICAL FIELD

Implementations are described that relate to coding systems. Various particular implementations relate to depth map coding.

BACKGROUND

Encoding video and depth is typically essential to efficiently transmitting and/or storing video that complies with new and emerging video compression formats. Additionally, encoding depth represents additional challenges.

SUMMARY

According to a general aspect, a depth picture is accessed that has depth values for a video picture from a particular view. The depth picture is capable of being used to render a video picture for a different view than the particular view to produce a rendered video picture. A depth coding rate is determined that results from coding at least a portion of the depth picture using a particular coding mode. A value of depth distortion is determined that results from coding at least the portion of the depth picture using the particular coding mode. Based on the value of depth distortion, a value for a correlation coefficient is determined between at least a portion of a specific video picture and a translated version of the portion of the specific video picture. The specific video picture is one or more of the video picture from the particular view or the rendered video picture. A value of video distortion is determined, for one or more of at least a portion of the video picture from the particular view or at least a portion of the rendered video picture, based on the value for the correlation coefficient. Whether to use the particular coding mode to code at least the portion of the depth picture is determined based on the value of video distortion and the depth coding rate.

According to another general aspect, a depth picture is accessed that has depth values for a video picture from a particular view. The depth picture is capable of being used to render a video picture for a different view than the particular view to produce a rendered video picture. A depth coding rate is determined that results from coding at least a portion of the depth picture using a particular coding mode. A value of depth distortion is determined that results from coding at least the portion of the depth picture using the particular coding mode. A value of video distortion is determined, for one or more of at least a portion of the video picture from the particular view or at least a portion of the rendered video picture, based on the value of the depth distortion. A multiplier is determined based on pixel values from one or more of at least the portion of the video picture from the particular view or at least the portion of the rendered video picture. A cost for the particular coding mode is determined based on the depth coding rate and the value of video distortion, wherein the value of the depth coding rate is multiplied by the multiplier. Based on the cost, it is determined whether to use the particular coding mode to code at least the portion of the depth picture.

The details of one or more implementations are set forth in the accompanying drawings and the description below. Even if described in one particular manner, it should be clear that implementations may be configured or embodied in various manners. For example, an implementation may be performed as a method, or embodied as apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

Encoding depth represents additional challenges as the conventional rate-distortion performance as well as the quality of depth image based rendering (DIBR) should be considered when encoding depth. In at least one implementation, new depth map coding methods are presented, which improve coding efficiency and subjective quality of the rendered views with the mode selection scheme based on a new distortion metric and optimization process.

Rendering distortion refers to the distortion in rendered images. Because rendered images are created based on depth information, errors in depth information (for example, from coding) impact rendering distortion. Thus, it is advantageous to consider rendering distortion when selecting a coding for depth information.

In at least one implementation, we first propose local estimations of rendering distortion, which depend on depth coding error, camera parameters, and video characteristics such as, for example, the amount of texture and flat region. We then apply Lagrangian optimization using both video and depth map information to select the optimal mode to code the depth map. Advantageously, this new mode selection scheme leads to a bit rate reduction for depth map coding with the same or better rendered view quality.

In DIBR, depth maps are used to render virtual views. The distortion in depth maps (as compared to the ground truth depth) will result in degradation in the visual quality of rendered views. When encoding depth maps, the conventional rate-distortion scheme cannot provide a direct measurement of rendering quality. Therefore, in at least one implementation, a new distortion metric is proposed, based on the characteristics of the distortion in a depth map and its effect on the rendered views, such that the mode decision can be optimized according to the rendering quality.

The proposed methods will improve the coding efficiency of the depth map while the visual quality of the rendered views is the same or better.

Figure 1:
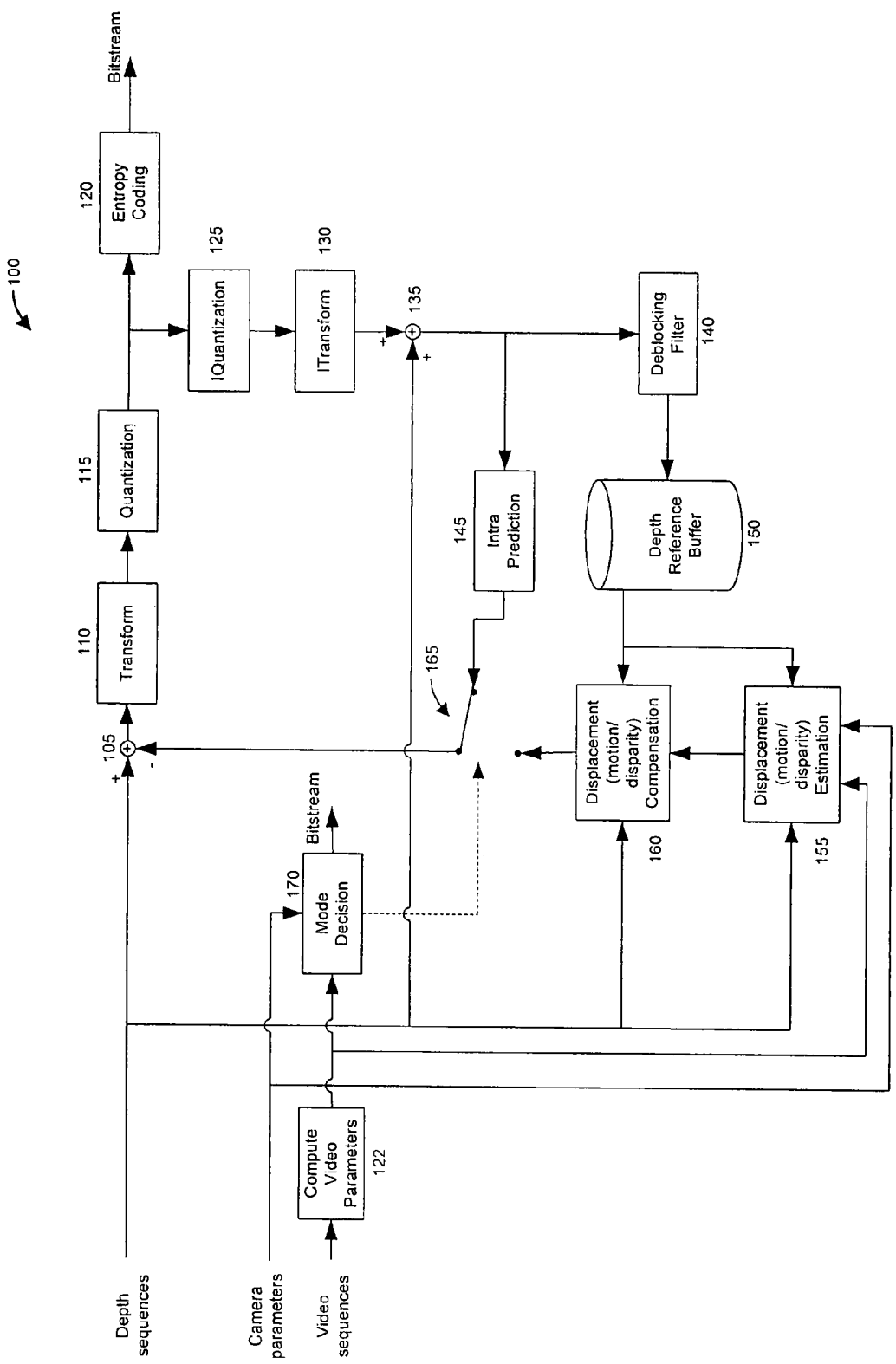
FIG. 1 is a diagram of an implementation of an encoder.

FIG. 1 shows an exemplary video encoder 100 to which the present principles may be applied, in accordance with an embodiment of the present principles. The video encoder 100 includes a combiner 105 having an output connected in signal communication with an input of a transformer 110. An output of the transformer 110 is connected in signal communication with an input of a quantizer 115. An output of the quantizer 115 is connected in signal communication with an input of an entropy coder 120 and an input of an inverse quantizer 125. An output of the inverse quantizer 125 is connected in signal communication with an input of an inverse transformer 130. An output of the inverse transformer 130 is connected in signal communication with a first non-inverting input of a combiner 135. An output of the combiner 135 is connected in signal communication with an input of an intra predictor 145 and an input of a deblocking filter 140. An output of the deblocking filter 140 is connected in signal communication with an input of a depth reference buffer 150. An output of the depth reference buffer 150 is connected in signal communication with a first input of a displacement (motion/disparity) compensator 160 and a first input of a displacement (motion/disparity) estimator 155. An output of the displacement (motion/disparity) estimator 155 is connected in signal communication with a second input of the displacement (motion/disparity) compensator 160. An output of the displacement (motion/disparity) compensator 160 is connected in signal communication with a first input of a switch 165. An output of the intra predictor 145 is connected in signal communication with a second input of the switch 165. An output of the switch 165 is connected in signal communication with an inverting input of the combiner 105. A second output of a mode decision module 170 is connected in signal communication with the switch 165, for providing a select signal selecting between the first and the second input of the switch 165. An output of a video parameters computer 122 is connected in signal communication with a second input of the mode decision module 170 and a third input of the displacement (motion/disparity) compensator 160.

A non-inverting input of the combiner 105, a third input of the displacement (motion/disparity) compensator 160, and a second input of the displacement (motion/disparity) estimator 155 are each available as inputs of the video encoder 100, for receiving depth sequences. A first input of the mode decision module 170 and a fourth input of a displacement (motion/disparity) estimator 155 are available as inputs of the video encoder 100, for receiving camera parameters. An input of the video parameters computer 122 is available as an input of the video encoder 100, for receiving video sequences. A first output of the mode decision module 170 and an output of the entropy coder 120 are available as outputs of the video encoder 100, for outputting a bitstream. The bitstream output by the mode decision module 170 may include, for example, an indication of the coding mode (for example, skip mode, intra mode, inter mode, as well as the sizes), and the motion vector if applicable.

It is to be appreciated that at least the mode decision module 170 differs from a conventional video encoder in at least the following manners. For embodiment 1 and embodiment 2 described herein after, the mode decision module 170 will input camera parameters and video frames to compute a new distortion measurement for a rate-distortion (RD) optimized mode decision. For embodiment 3 described herein, besides the new distortion computed using embodiment 1 or embodiment 2, in module 170, new Lagrange multiplier of the rate-distortion cost is calculated using local video parameters. The new distortion and the new Lagrange multiplier are used for RD mode decision. In other implementations, these functions of mode decision module 170 may be performed, at least in part, by a block other than the mode decision module 170, and even by a block(s) not shown in FIG. 1. For example, another implementation performs these functions in a processing device (not shown in FIG. 1) that controls the encoder of FIG. 1. The control of FIG. 1 includes, in this implementation, providing the inputs to the encoder of FIG. 1, accessing the outputs from the encoder of FIG. 1, and controlling the timing and signal flow of the encoder of FIG. 1.

Note that the mode decision module 170 may receive various feedback inputs from the rest of FIG. 1 in order to accumulate rate and distortion information for various encoding modes. In this way, the mode decision module 170 can select an optimal encoding mode according to a rate-distortion equation (rate-distortion equations are discussed at length further below in this application). The mode decision module 170 may also provide the results of this optimization to the blocks of FIG. 1 in order to control FIG. 1 to encode using the optimal encoding mode.

The mode decision module 170, or a processing device that controls the encoder of FIG. 1, may be implemented in, for example, a general purpose computer, or a function-specific video encoder. Such a computer or encoder may include hardware, firmware, and/or software that is programmed to perform one or more of the algorithms of FIG. 9, 10, or 11, or any other algorithm provided in this application.

Figure 2:
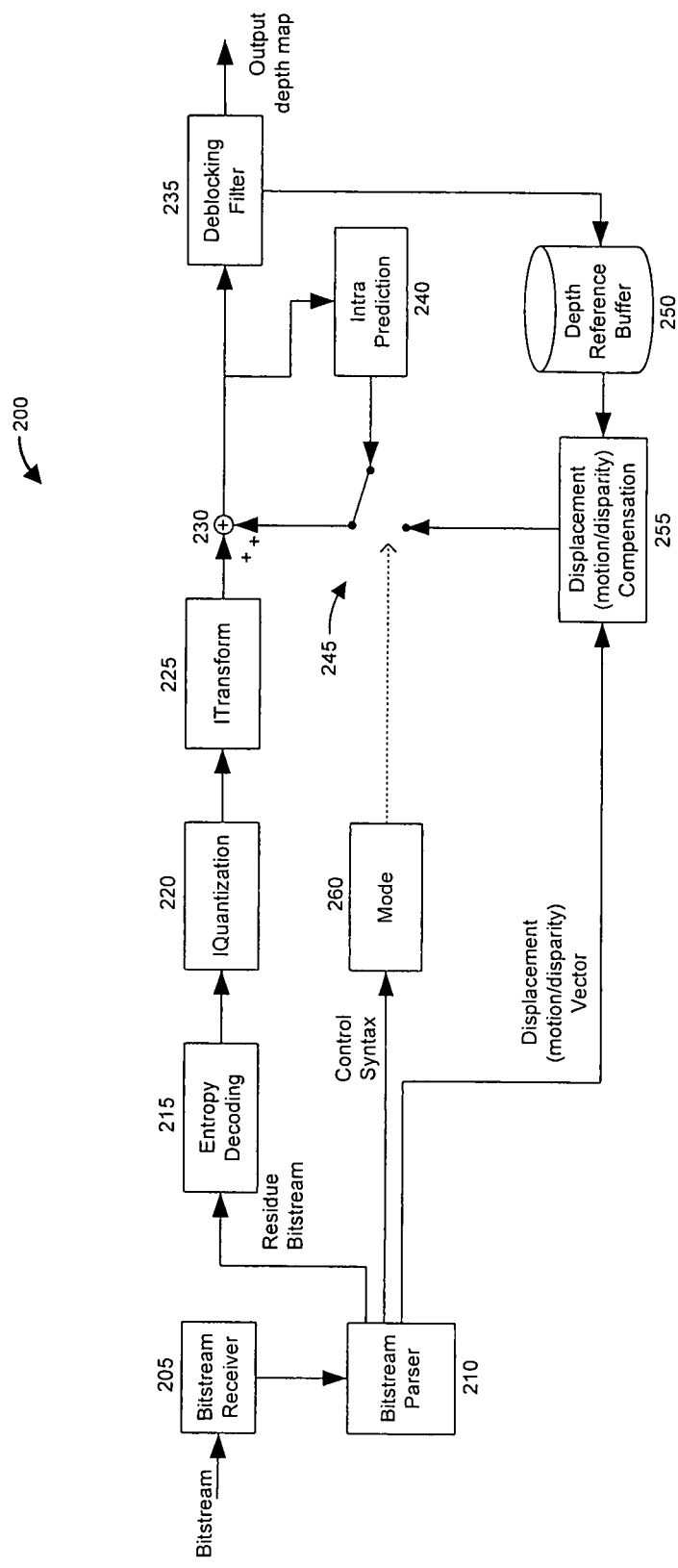
FIG. 2 is a diagram of an implementation of a decoder.

FIG. 2 shows an exemplary video decoder 200 to which the present principles may be applied, in accordance with an embodiment of the present principles. The video decoder 200 includes a bitstream receiver 205 having an output connected in signal communication with an input of a bitstream parser 210. A first output of the bitstream parser 210 is connected in signal communication with an input of an entropy decoder 215. An output of the entropy decoder 215 is connected in signal communication with an input of an inverse quantizer 220. An output of the inverse quantizer 220 is connected in signal communication with an input of an inverse transformer 225. An output of the inverse transformer 225 is connected in signal communication with a first non-inverting input of a combiner 230. An output of the combiner 230 is connected in signal communication with an input of a deblocking filter 235 and an input of an intra predictor 240. An output of the deblocking filter 235 is connected in signal communication with an input of a depth reference buffer 250. An output of the depth reference buffer 250 is connected in signal communication with a first input of a displacement (motion/disparity) compensator 255. An output of the displacement (motion/disparity) compensator 255 is connected in signal communication with a second input of a switch 245. An output of the intra predictor 240 is connected in signal communication with a first input of the switch 245. An output of the switch 245 is connected in signal communication with a second non-inverting input of the combiner 230. An output of a mode module is connected in signal communication with the switch 245, for providing a select signal selecting between the first and the second input of the switch 245. A second output of the bitstream parser 210 is connected in signal communication with an input of the mode module 260. A third output of the bitstream parser 210 is connected in signal communication with a second input of the displacement (motion/disparity) compensator 255. An input of the bitstream receiver 205 is available as an input of the video decoder 200, for receiving a bitstream. An output of the deblocking filter 235 is available as an output of the video decoder 200, for outputting a depth map.

FIGS. 1 and 2 show particular implementations, but other implementations are contemplated. For example, another implementation does not have separate inputs on one or more of the blocks of FIG. 1 (or FIG. 2). Rather, a single input is used to receive multiple signals. As a specific example, mode decision module 170 may have only a single input. The single input receives the camera parameters, and also receives the video information from video parameters computer 122. Further, another implementation of mode decision module 170 only has a single output that provides both the bitstream and the select signal. Similarly, the encoder 100 may have a single input for receiving depth sequences, and then route those depth sequences to each of combiner 105, compensator 160, and estimator 155. Similar adaptations are contemplated for the implementation of FIG. 2, as well as other figures and implementations described throughout this application.

Figure 3:
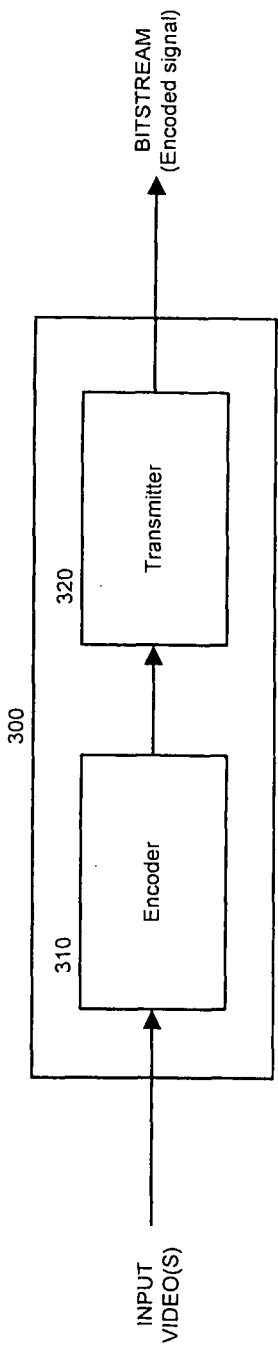
FIG. 3 is a block diagram of an implementation of a video transmitter.

FIG. 3 shows an exemplary video transmission system 300, to which the present principles may be applied, in accordance with an implementation of the present principles. The video transmission system 300 may be, for example, a head-end or transmission system for transmitting a signal using any of a variety of media, such as, for example, satellite, cable, telephone-line, or terrestrial broadcast. The transmission may be provided over the Internet or some other network.

The video transmission system 300 is capable of generating and delivering video content encoded using skip mode with depth. This is achieved by generating an encoded signal(s) including depth information or information capable of being used to synthesize the depth information at a receiver end that may, for example, have a decoder.

The video transmission system 300 includes an encoder 310 and a transmitter 320 capable of transmitting the encoded signal. The encoder 310 receives video information and generates an encoded signal(s) there from using skip mode with depth. The encoder 310 may be, for example, the encoder 100 described in detail above.

The transmitter 320 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers. The transmitter may include, or interface with, an antenna (not shown). Accordingly, implementations of the transmitter 320 may include, or be limited to, a modulator.

Figure 4:
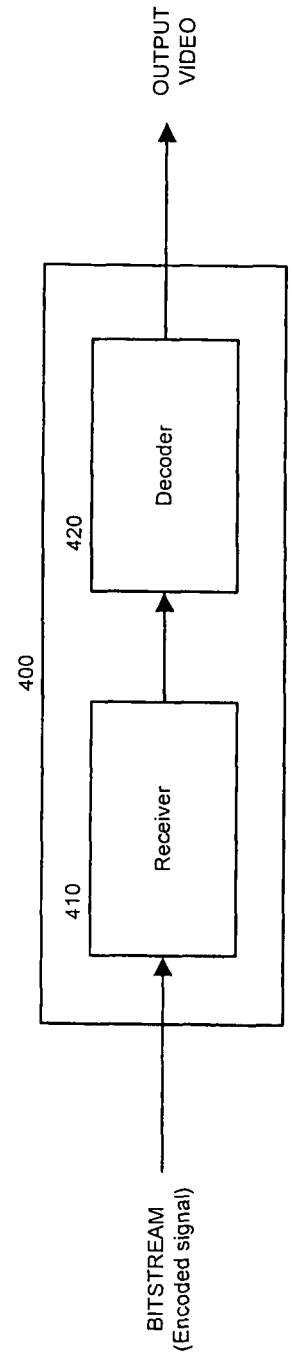
FIG. 4 is a block diagram of an implementation of a video receiver.

FIG. 4 shows an exemplary video receiving system 400 to which the present principles may be applied, in accordance with an embodiment of the present principles. The video receiving system 400 may be configured to receive signals over a variety of media, such as, for example, satellite, cable, telephone-line, or terrestrial broadcast. The signals may be received over the Internet or some other network.

The video receiving system 400 may be, for example, a cell-phone, a computer, a set-top box, a television, or other device that receives encoded video and provides, for example, decoded video for display to a user or for storage. Thus, the video receiving system 400 may provide its output to, for example, a screen of a television, a computer monitor, a computer (for storage, processing, or display), or some other storage, processing, or display device.

The video receiving system 400 is capable of receiving and processing video content including video information. The video receiving system 400 includes a receiver 410 capable of receiving an encoded signal, such as for example the signals described in the implementations of this application, and a decoder 420 capable of decoding the received signal.

The receiver 410 may be, for example, adapted to receive a program signal having a plurality of bitstreams representing encoded pictures. Typical receivers perform functions such as, for example, one or more of receiving a modulated and encoded data signal, demodulating the data signal from one or more carriers, de-randomizing the energy in the signal, de-interleaving the data in the signal, and error-correction decoding the signal. The receiver 410 may include, or interface with, an antenna (not shown). Implementations of the receiver 410 may include, or be limited to, a demodulator.

The decoder 420 outputs video signals including video information and depth information. The decoder 420 may be, for example, the decoder 400 described in detail above.

Figure 5:
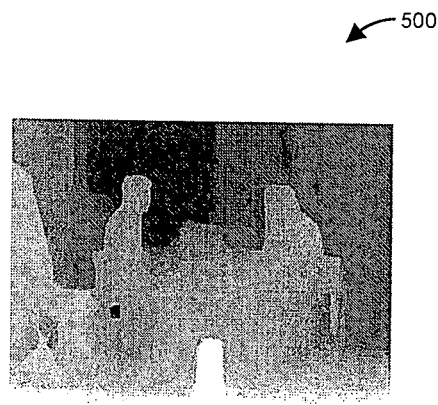
FIG. 5 is an example of a depth map.
Figure 6:
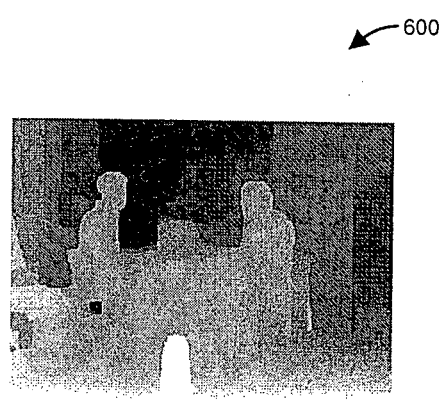
FIG. 6 is another example of a depth map.

New data formats including both video and the corresponding depth maps, such as multi-view plus depth (MVD), enable new video applications such as three-dimensional television (3DTV) and free-viewpoint video (FVV). FIG. 5 shows an example of a depth map 500 to which the present principles may be applied, in accordance with an embodiment of the present principles. FIG. 6 shows an example of another depth map 600 to which the present principles may be applied, in accordance with an embodiment of the present principles.

Intermediate video views (virtual views) can be generated using the techniques of depth image based rendering (DIBR), which takes the transmitted/stored video views (reference views) and the corresponding depth maps as input.

Figure 7:
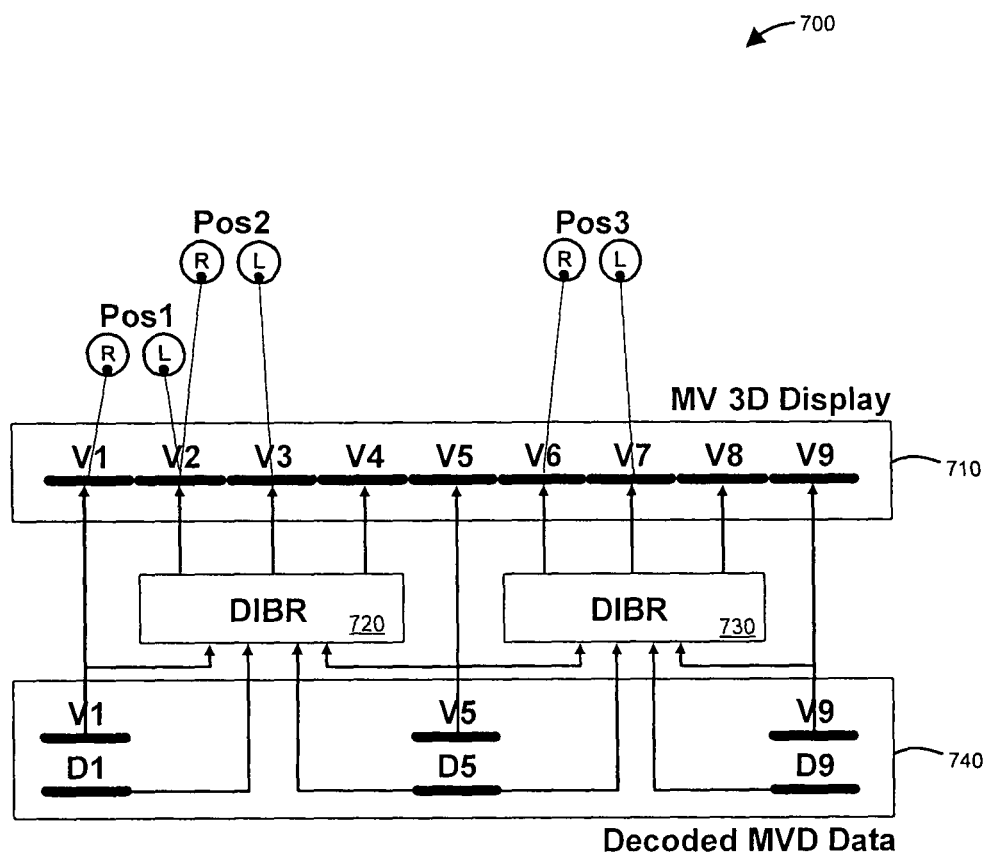
FIG. 7 is a diagram of an implementation of a framework for generating nine output views (N=9) out of 3 input views with depth (K=3).

FIG. 7 shows an exemplary framework 700 for generating nine output views (N=9) out of 3 input views with depth (K=3), to which the present principles may be applied, in accordance with an embodiment of the present principles. The framework 700 involves an auto-stereoscopic 3D display 710, which supports output of multiple views, a first depth image-based renderer 720, a second depth image-based renderer 730, and a buffer for decoded data 740. The decoded data is a representation known as Multiple View plus Depth (MVD) data. The nine views are denoted by V1 through V9. Corresponding depth maps for the three input views are denoted by D1, D5, and D9. Any virtual camera positions in between the captured camera positions (for example, Pos 1, Pos 2, Pos 3) can be generated using the available depth maps (D1, D5, D9), as shown in FIG. 7. As can be seen in FIG. 7, the baseline between the actual cameras (V1, V5, and V9) used to capture data can be large. As a result, the correlation between these cameras is significantly reduced and coding efficiency of these cameras may suffer since the coding efficiency would only rely on temporal correlation.

A rate distortion optimized mode selection scheme has been widely used in video coding to select the best coding mode to achieve high quality decoded video with reduced bitrate. Using Lagrangian optimization, the best mode is selected which results in a minimum value of L as follows:

$$L = D + \lambda R \tag{0}$$

where D denotes distortion, $\lambda$ denotes the Lagrange multiplier, and R denotes the bitrate. The distortion is usually calculated as the sum of squared difference (SSD) between the original pixel values and the reconstructed pixel values. However, when this is applied to depth map coding according to certain implementations in this application, the distortion reflects the distortion of the rendered views, because what is typically important is the quality of the synthesized scene using the depth map, not the quality of the decoded depth map itself. Therefore, it is useful to derive the relationship between the distortion of the compressed depth map and the resulting distortion of the rendered views, such that the mode decision is optimized with respect to the rendering quality.

In at least one system, the relationship between the distortion in a depth map and the resulting translational error of rendered pixel position is derived. The effect of this rendering position error on the distortion in the rendered views (in terms of pixel values) is also be analyzed.

In another system, the rendering error due to depth coding distortion based on multiple local parameters is estimated. To encode the depth map, the estimated rendering distortion is used for mode decision. In a further system, the rendering error with multiple local parameters is estimated, and a Lagrange multiplier is determined using video and depth parameters. We provide details below on various embodiments for locally estimating rendering error, and also for an optimization procedure for the Lagrange parameter.

Preliminary: Derivation of Geometry Error from Depth Map Distortion

The relationship between the actual depth value Z and the 8-bit depth map value L is as follows:

$$L(x, y) = Rnd\left(\frac{\frac{1}{Z(x, y)} - \frac{1}{Z_{far}}}{\frac{1}{Z_{near}} - \frac{1}{Z_{far}}} \times 255\right), \tag{1}$$

where Rnd( ) rounds up a value to the nearest integer in [0, 255], $Z_{near}$ and $Z_{far}$ are the nearest and the farthest depth value in the scene, which correspond to a value of 255 and a value of 0 in the depth map L, respectively.

When lossy compression is applied to a depth map L, the resulting distortion ($\Delta L$) in the decoded map causes geometry errors in the rendered pixel position ($\Delta P$), if the decoded map is used for view interpolation (as would be the case in an MVD system). Our goal is to analyze how the geometric error results in errors in the interpolated view. First, an image coordinate ($x_{im}$, $y_{im}$) in the p-th view can be mapped into a camera coordinate in the p'-th view using a camera intrinsic parameter A and extrinsic parameters rotation R and translation T as follows:

$$\begin{pmatrix} x' \\ y' \\ z' \end{pmatrix} = A_{p'} R_{p'}^{-1} \left\{ R_p A_p^{-1} \begin{pmatrix} x_{im} \\ y_{im} \\ 1 \end{pmatrix} Z_p(x_{im}, y_{im}) + T_p - T_{p'} \right\} \tag{2}$$

where Z is a depth value. Hence, the image coordinate in the p'-th view will be as follows:

$$\begin{pmatrix} x'_{im} \\ y'_{im} \\ 1 \end{pmatrix} = \tag{3}$$

$$\begin{pmatrix} \frac{x'}{z'} \\ \frac{y'}{z'} \\ \frac{z'}{z'} \end{pmatrix} = A_{p'} R_{p'}^{-1} R_p A_p^{-1} \begin{pmatrix} x_{im} \\ y_{im} \\ 1 \end{pmatrix} + \frac{1}{Z_p(x_{im}, y_{im})} A_{p'} R_{p'}^{-1} \{T_p - T_{p'}\}.$$

When there is a depth error $\Delta Z$, mapping (2) and mapping (3) can be represented by Equation (4) and Equation (5) as follows:

$$\begin{pmatrix} x' + \Delta x' \\ y' + \Delta y' \\ z' + \Delta z' \end{pmatrix} = \tag{4}$$

$$A_{p'} R_{p'}^{-1} \left\{ R_p A_p^{-1} \begin{pmatrix} x_{im} \\ y_{im} \\ 1 \end{pmatrix} (Z_p(x_{im}, y_{im}) + \Delta Z_p(x_{im}, y_{im}) + T_p - T_{p'}) \right\}$$

-continued $$\begin{pmatrix} x'_{im} + \Delta x'_{im} \\ y'_{im} + \Delta y'_{im} \\ 1 \end{pmatrix} = \begin{pmatrix} \frac{x' + \Delta x'}{z' + \Delta z'} \\ \frac{y' + \Delta y'}{z' + \Delta z'} \\ \frac{z' + \Delta z'}{z' + \Delta z'} \end{pmatrix} = A_{p'} R_{p'}^{-1} R_p A_p^{-1} \begin{pmatrix} x_{im} \\ y_{im} \\ 1 \end{pmatrix} + \frac{1}{Z_p(x_{im}, y_{im}) + \Delta Z_p(x_{im}, y_{im})} A_{p'} R_{p'}^{-1} \{T_p - T_{p'}\} \quad (5)$$

The derivation from Equation (4) to Equation (5) is under the approximately parallel camera setting assumption, so that the depth values in different camera coordinates z and z' will be approximately equal. Then the position error due to a depth map error in the p-th view $\alpha L_p$ can be calculated by subtracting Equation (3) from Equation (5) as follows:

$$\begin{pmatrix} \Delta x'_{im} \\ \Delta y'_{im} \\ 0 \end{pmatrix} = \begin{pmatrix} \frac{x' + \Delta x'}{z' + \Delta z'} - \frac{x'}{z'} \\ \frac{y' + \Delta y'}{z' + \Delta z'} - \frac{y'}{z'} \\ 0 \end{pmatrix} \quad (6)$$

$$= \left( \frac{1}{Z_p(x_{im}, y_{im}) + \Delta Z_p(x_{im}, y_{im})} - \frac{1}{Z_p(x_{im}, y_{im})} \right) A_{p'} R_{p'}^{-1} \{T_p - T_{p'}\}$$

$$= \frac{\Delta L_p(x_{im}, y_{im})}{255} \left( \frac{1}{Z_{near}} - \frac{1}{Z_{far}} \right) A_{p'} R_{p'}^{-1} \{T_p - T_{p'}\}$$

This reveals that, under the approximately parallel camera setting assumption, there is a linear relationship between the depth map distortion $\Delta L$ and the translational rendering position error $\Delta P$ in the rendered view as follows:

$$\Delta P = \begin{pmatrix} \Delta x'_{im} \\ \Delta y'_{im} \end{pmatrix} = \Delta L_p(x_{im}, y_{im}) \begin{pmatrix} k_x \\ k_y \end{pmatrix} \quad (7)$$

where $k_x$ and $k_y$ are the multiplication factors determined from the camera parameters and the depth ranges as shown in Equation (6). Since the multiplication factors depend on the camera settings and depth ranges, the same amount of depth map distortion can cause different amounts of geometry error. For example, if the distance between cameras $|T_P - T_{P'}|$ is large, or the camera captures a near object so that $1/Z_{near}$ becomes large, then the geometry error will increase as $k_x$ and $k_y$ will be large. This indicates that dense camera settings and farther away scene compositions are more robust to depth coding distortion in the rendering process.

In addition, the effect of the rendering position error $\Delta P$ on the quality of the rendered view depends on local characteristics of the video. For example, in areas of a video frame with complex textures and objects, the distortion caused by the geometry error will be significant, as different positions should have quite different pixel values. On the other hand, in the areas with simple textures or flat (homogenous) regions, the amount of distortion due to geometry error will be small since pixels at different positions are similar. Therefore, it is useful to link the geometry error to the rendered view distortion according to the local video characteristics.

Embodiment 1

Local Estimations of Rendering Distortion by Referencing a Video Frame

In a DIBR system, a view can be rendered using pairs of video frames and the corresponding depth maps of the left and right views. For example, in FIG. 7, V2 can be rendered using V1 and D1 of the right view, and V5 and D5 of the left view. The exact amount of distortion in the rendered view can be measured if we compare the rendered view with the ground truth, that is, the captured view at the same position of the rendered view. However, the ground truth may not be available since the rendered view can be generated for any arbitrary viewpoint. It would also typically require too much computational complexity if the actual view rendering process is performed during the depth map coding.

Instead, we propose to use the video frame, which belongs to the same viewpoint as the depth map. This video frame is always available since it is encoded with the depth map as a pair. When encoding a particular block of the depth map, the distortion at the rendered view can be approximated using this video frame by calculating the sum of squared difference between the block in the video frame co-located with the depth map block to be coded, and its translated one by the rendering error $\Delta P$ calculated as follows:

$$SSE = (X_n - X_m)^T (X_n - X_m) = X_n^T X_n - 2 X_n^T X_m + X_m^T X_m, \quad (8)$$

where $X_n$ is a vector consisting of pixel values in the video block at the same location with the depth map block being encoded, and $X_m$ is formed by translating each pixel position in $X_n$ by the corresponding geometry error $\Delta P$ and taking the pixel values at the translated position in the same video frame.

Figure 8:
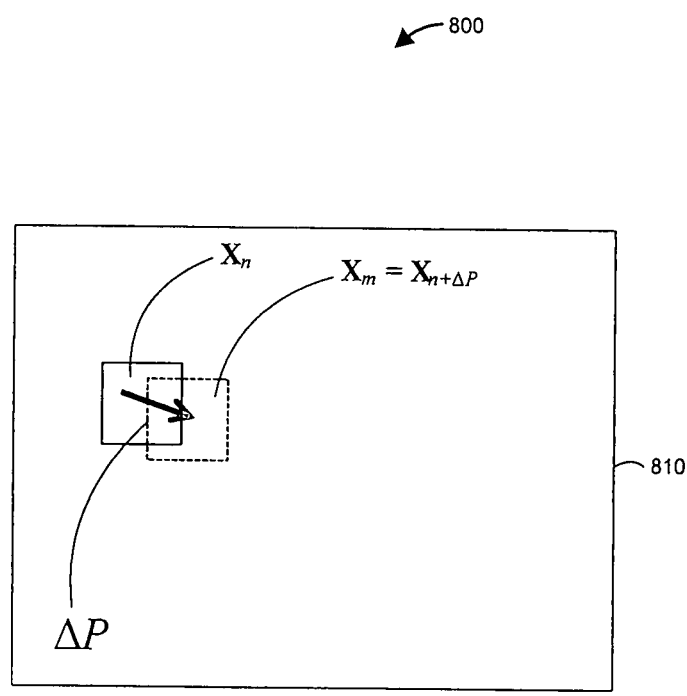
FIG. 8 shows an example of a block of pixels $X_n$ within a video frame and its translated block $X_m$ by geometry error $\Delta P$, where the same amount of geometry error is applied to every pixel in $X_n$.

FIG. 8 shows an example 800 of coding block $X_n$ within a video frame 810 and its translated block $X_m$ by geometry error $\Delta P$, in accordance with an embodiment of the present principles. In further detail, FIG. 8 illustrates the case when there is same amount of geometry error for every pixel in $X_n$. That is, the macroblock is shifted by $\Delta P$. By visually showing the shift, FIG. 8 can assist in understanding how the distortion calculation is performed. Of course, in other implementations, $\Delta P$ can be different for every pixel within a macroblock.

Figure 9:
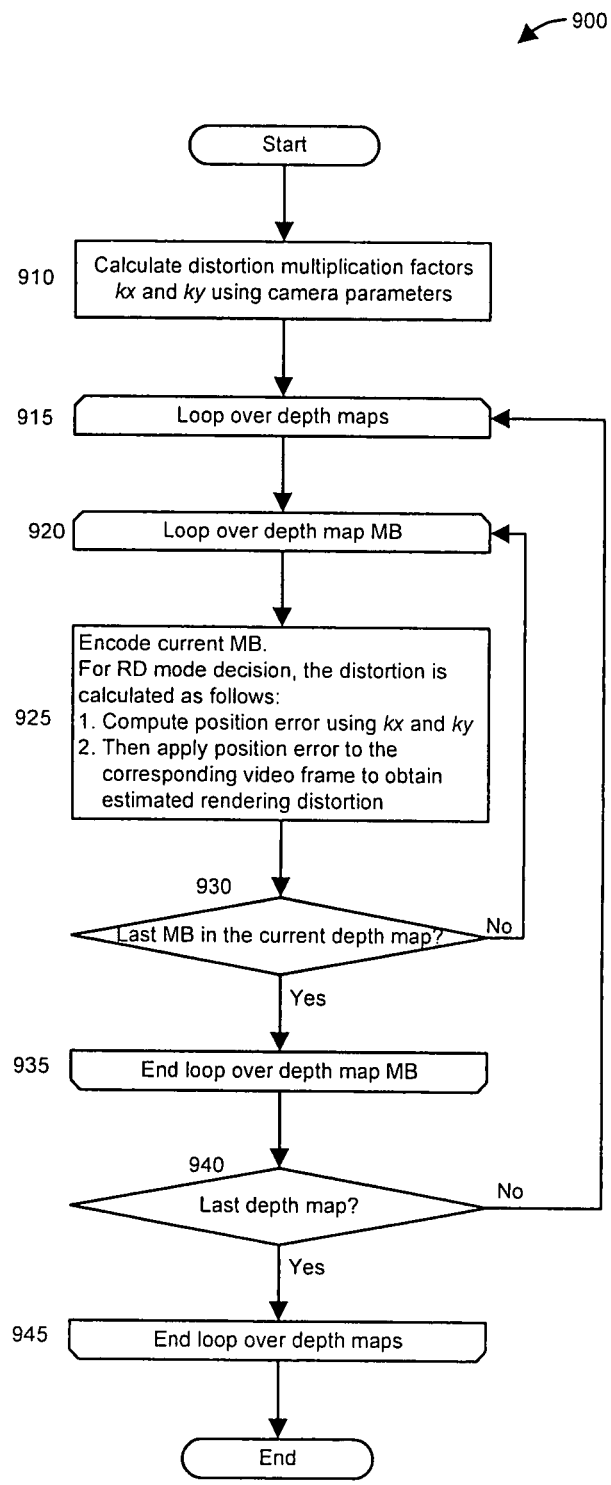
FIG. 9 is a diagram of an implementation of an encoding process.

FIG. 9 shows an exemplary video coding method 900, in accordance with an embodiment of the present principles. Method 900 corresponds to the above described embodiment 1. At step 910, distortion factors kx and ky are calculated using camera parameters. At step 915, a loop is begun over depth maps. At step 920 a loop is begun over depth map macroblocks (MBs). At step 925, the current macroblock is encoded where, for a rate-distortion decision relating to the encoding, the distortion is calculated by (1) computing the position error using kx and ky and (2) applying the position error to the corresponding video frame to obtain the estimated rendering distortion. Step 925 typically includes an optimization across all encoding modes that are being considered, using the rate-distortion equation. At step 930, it is determined whether or not the current macroblock is the last macroblock (to be encoded) in the current depth map. If so, then control is passed to a step 935. Otherwise, control is returned to the step 920. At step 935, the loop over the depth map macroblocks is terminated. At step 940, it is determined whether or not the current depth map is the last depth map (to be encoded). If so, then control is passed to a step 945. Otherwise, control is returned to the step 915. At step 945, the loop over the depth maps is terminated.

Embodiment 2

Local Estimations of Rendering Distortion by Using an AR Model

The distortion estimation method described in the embodiment 1 is conceptually simple. However, the distortion estimation method of embodiment 1 requires accessing the video frame pixel by pixel. Since each pixel in the block $X_n$ can have a different amount of geometry error $\Delta P(i)$, the corresponding pixels after displacement (that is, $X_m$) are not likely to be located in consecutive memory positions. Access to non-consecutive memory locations can be expensive in many practical implementations. For example, if a random access memory is used to store video pixels, which can access 64 bits or 8 pixels with one addressing operation with 5 cycles and the next successive 64 bits with 1 cycle with a burst mode access, for 16×16 pixels, a total of 16×16×5 cycles, that is, 1280 cycles, will be consumed when each pixel location is not successive, while only 16×(5+1) cycles, that is, 96 cycles will be required when pixels are in successive locations for each row, a factor of 13 in the difference in memory access time. We propose a simpler method to estimate the distortion in the rendered view, which does not require accessing non-consecutive memory locations.

Under the stationarity and zero mean assumption of the video signal, the correlation coefficient can be expressed as follows:

$$\rho = \frac{\text{cov}(X_n, X_m)}{\sigma_{X_n} \sigma_{X_m}} = \frac{\text{cov}(X_n, X_m)}{\sigma_{X_n}^2} = \frac{X_n^T X_m}{X_n^T X_n}. \tag{9}$$

Note that the zero mean condition, which can be achieved by removing the mean from the video signal, will not change the resulting SSE. Thus, from Equation (8) and Equation (9), the SSE can be expressed in terms of the correlation coefficient and the variance of the video block as follows:

$$SSE = (N-1)\sigma_{X_n}^2 - 2(N-1)\rho\sigma_{X_n}^2 + (N-1)\sigma_{X_m}^2 = 2(N-1)(1-\rho)\sigma_{X_n}^2 \tag{10}$$

where N represents the number of pixels in the block.

Intuitively, as the amount of geometry error $|\Delta P|$ increases, the correlation will go down ($\rho$ decreases), leading to a larger SSE. Thus, we use the 1$^{st}$ order autoregressive model to represent the correlation under geometry error $\Delta P$, as $\rho = \rho_1^{|\Delta P|}$, where $\rho_1$ represents the video correlation coefficient when translated by one pixel. We are building a model in which $\rho_1$ is pre-computed by translating the whole block by one pixel. Other models may vary use different assumptions of course. Modeled in this manner, the correlation decreases (as expected) as the amount of geometry error increases. This decrease occurs because the correlation coefficient $\rho_1$ is less than one, and a larger $|\Delta P|$ will therefore produce lower values of $\rho$ in the 1$^{st}$ order AR model. Note that the 1$^{st}$ order AR model is a general model that can, in theory, be applied to model any function (for example $\rho$) based on any variable (for example $|\Delta P|$). However, there is no guarantee that the 1$^{st}$ order AR model will be useful or accurate for a given application. For our case, the inventors have determined that using it to model the correlation coefficient under geometry error produces desired results, that is, the correlation decreases as the amount of geometry error increases.

Then, Equation (10) can be approximated using the first order autoregressive model for the correlation coefficient as follows:

$$SSE \approx 2(N-1)\left(1 - \frac{1}{N}\sum_{i=1}^{N}\rho_1^{|\Delta P(i)|}\right)\sigma_{X_n}^2, \tag{11}$$

In Equation (11), to compute the correlation coefficient of the block $X_n$, we average the correlation at a different pixel i with geometry error $\Delta P(i)$ as mean($\rho_1^{|\Delta P(i)|}$). In this model, $\rho_1$ is constructed block-wise, then the numbers $\Delta P(i)$ for given pixels are plugged-in to the model. Another possible way to compute the correlation coefficient of the block $X_n$ is to average $\Delta P(i)$, such that the correlation coefficient is $\rho_1^{\text{mean}(|\Delta P(i)|)}$. Note that from Equation (7), $\Delta P(i)$ is a function of the depth distortion and camera parameters (to compute $k_x$ and $k_y$).

With the autoregressive model for SSE estimation, the correlation coefficient $\rho_1$ and the variance of the video block can be calculated first (in a pre-processing step, for example) for a given block, which involves consecutive memory accesses, then the distortion in the rendered view can be estimated (in real time during encoding, for example) as in Equation (11). Furthermore, the correlation coefficient and variance for each block can be also calculated and stored beforehand to ease the real time processing.

Figure 10:
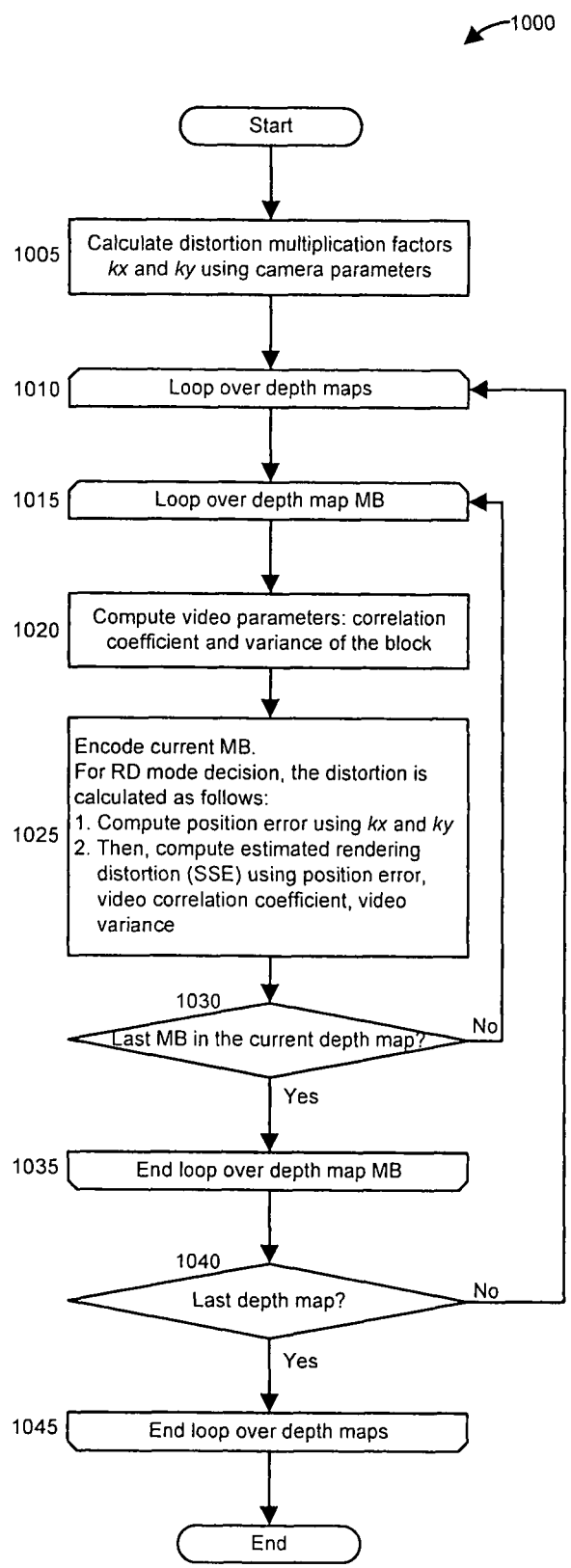
FIG. 10 is a diagram of an implementation of another encoding process.

FIG. 10 shows an exemplary video coding method 1000, in accordance with an embodiment of the present principles. Method 1000 corresponds to the above described embodiment 2. At step 1005, distortion factors kx and ky are calculated using camera parameters. At step 1010, a loop is begun over depth maps. At step 1015 a loop is begun over depth map macroblocks (MBs). At step 1020, video parameters are computed such as, for example, a correlation coefficient and variance of a block. At step 1025, the current macroblock is encoded where, for a rate-distortion decision relating to the encoding, the distortion is calculated by (1) computing the position error using kx and ky and (2) computing the estimated rendering distortion (SSE) using the position error, video correlation coefficient, and video variance. Step 1025 may use equation 11 for part (2). Step 1025 typically includes an optimization across all encoding modes that are being considered, using the rate-distortion equation. At step 1030, it is determined whether or not the current macroblock is the last macroblock (to be encoded) in the current depth map. If so, then control is passed to a step 1035. Otherwise, control is returned to the step 1015. At step 1035, the loop over the depth map macroblocks is terminated. At step 1040, it is determined whether or not the current depth map is the last depth map (to be encoded). If so, then control is passed to a step 1045. Otherwise, control is returned to the step 1010. At step 1045, the loop over the depth maps is terminated.

Embodiment 3

Optimization of Lagrange (Lagrangian) Multiplier

For the optimized coding mode selection, the Lagrangian optimization has been widely used where the optimal coding mode is chosen which results in the minimal Lagrangian cost $L = D + \lambda R$, where D is the distortion and R is the bitrate generated to code a macroblock. Instead of using the depth map distortion directly for D, in Embodiment 1 and 2, we propose to use the estimation of the distortion in the rendered view, which is estimated using the depth map error, while R is the bitrate to code the depth map. The rendered view may be generated using a set of reference views. However, if we assume that each view is coded independently, we can express the Lagrangian cost as follows:

$$L = D_{rendered}(D_{depth}) + \lambda R_{depth} \quad (14)$$

D and R vary by the mode under consideration. To find the optimized $\lambda$ for minimizing the cost L, if the distortion and the bitrate can be expressed as a function of quantization step size Q, the Lagrangian multiplier $\lambda$ can be calculated by taking the derivative of the Lagrangian cost and solving $dL/dQ=0$:

$$\lambda = -\frac{dD(Q)/dQ}{dR(Q)/dQ}. \quad (15)$$

The distortion at the depth map can be approximated as a function of quantization step size Q as follows:

$$D_{depth}(Q) = c_1 Q \quad (16)$$

where $c_1$ is a scaling factor. Please note that $D_{depth}$ represents the absolute difference. Then this $D_{depth}$ can be used to estimate the distortion as the squared difference at the rendered view. If the auto regressive model derived herein is used, then this squared difference at the rendered view becomes the following:

$$D_{rendered}(Q) = 2(N-1)(1-(1/N)\rho_1^{kD_{depth}(Q)})\sigma_{video}^2 = 2(N - \rho_1^{kc_1 Q})\sigma_{video}^2 \quad (17)$$

Equation 17 is based, at least in part, on Equations 7, 10, and 11. For large values of N, we get the expression on the right-hand side of Equation 17.

Moreover, the bitrate of the depth map can be expressed as follows:

$$R(Q) = \frac{c_2 \sigma_{depth}^2}{Q^2} \quad (18)$$

Hence, the Lagrange multiplier is as follows, after determining the derivative of Equation 17 and dividing by the derivative of Equation 18, and multiplying by $-1$, as provided for in Equation 15:

$$\lambda = c \cdot (\ln \rho_1) \cdot \rho_1^{kc_1 Q} \cdot Q^3, \quad (19)$$

$$\text{where } c = \frac{\sigma_{video}^2}{\sigma_{depth}^2} \frac{c_1}{c_2} k.$$

The constant k can be found from the camera parameters as in Equation (6), and $c_1$ and $c_2$ can be found by experiment. For example, various values of $D_{depth}$ can be determined for different values of Q, and a least-squares line can be determined to find a value of $c_1$ according to Equation 16. Similarly, various values of R can be determined for different values of Q, and the depth variance can be determined, and a least-squares line can be determined to find a value of $c_2$ according to Equation 18. The variances for video and depth map are for each block. However, the average of the variances for a large number of blocks can be used for simplicity to avoid calculating $\lambda$ for each block. As should be clear, $\lambda$ can be calculated ahead of time in a pre-processing step.

As can be seen, $\lambda$ may have different values based on evaluated criteria. The criteria include, for example, the video variance, the depth variance, k, $\rho_1$, Q, R(Q), $D_{depth}(Q)$, $c_1$, and $c_2$.

Figure 11:
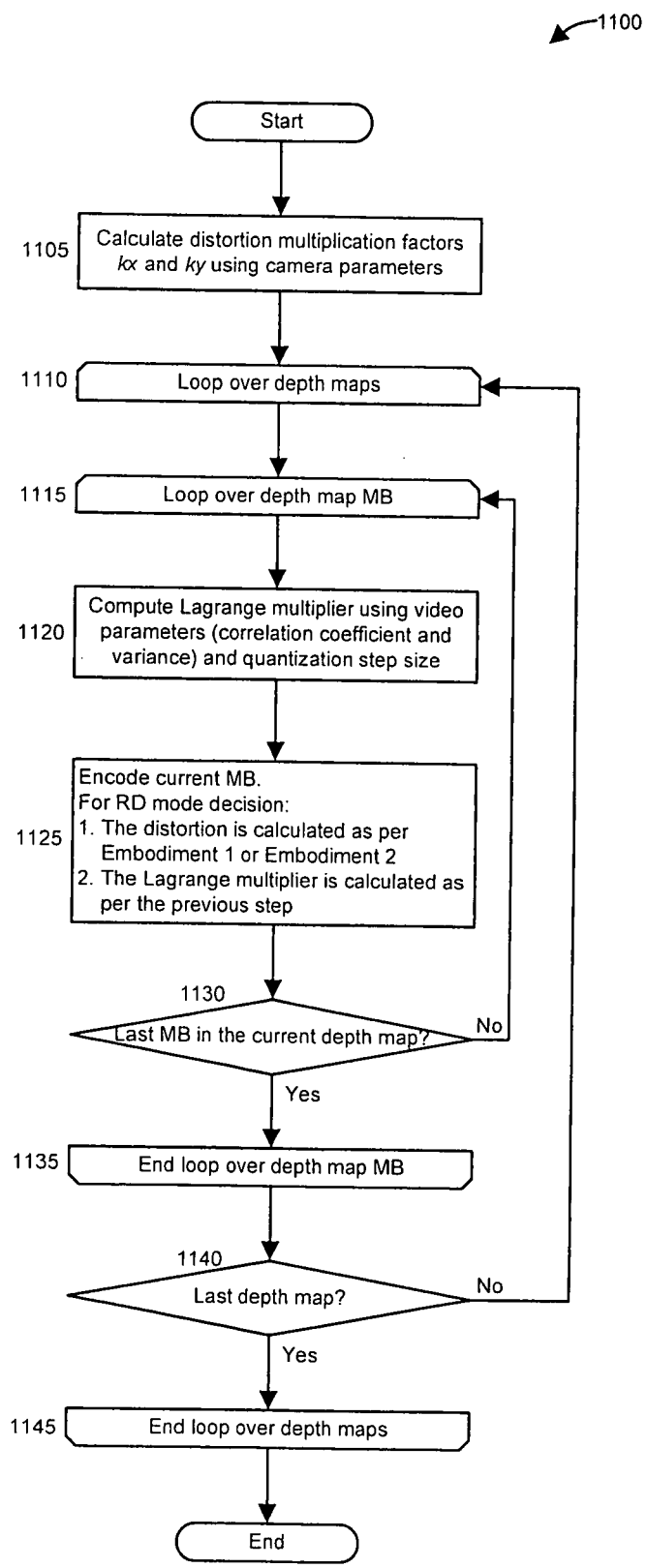
FIG. 11 is a diagram of an implementation of yet another encoding process.

FIG. 11 shows an exemplary video coding method 1100, in accordance with an embodiment of the present principles. Method 1100 corresponds to the above described embodiment 3. At step 1105, distortion factors kx and ky are calculated using camera parameters. At step 1110, a loop is begun over depth maps. At step 1115 a loop is begun over depth map macroblocks (MBs). At step 1120, a Lagrange multiplier is computed using video parameters (for example, a correlation coefficient and two variances) and a quantization step size. At step 1125, the current macroblock is encoded where, for a rate-distortion decision relating to the encoding, the distortion is calculated as described with respect to Embodiment 1 (see, for example, FIG. 9) or Embodiment 2 (see, for example, FIG. 10), and the Lagrange multiplier is computed in preceding step 1120. Step 1125 typically includes an optimization across all encoding modes that are being considered. At step 1130, it is determined whether or not the current macroblock is the last macroblock (to be encoded) in the current depth map. If so, then control is passed to a step 1135. Otherwise, control is returned to the step 1115. At step 1135, the loop over the depth map macroblocks is terminated. At step 1140, it is determined whether or not the current depth map is the last depth map (to be encoded). If so, then control is passed to a step 1145. Otherwise, control is returned to the step 1110. At step 1145, the loop over the depth maps is terminated.

Figure 12:
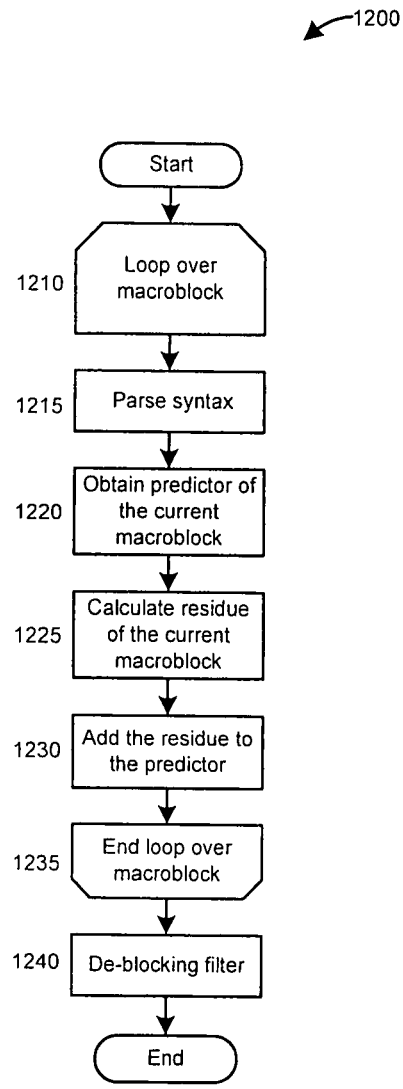
FIG. 12 is a diagram of an implementation of a decoding process.

FIG. 12 shows an exemplary method 1200 for decoding a depth map, in accordance with an embodiment of the present principles. Method 1200 corresponds to any of the above described embodiments 1 through 3. At step 1210, a loop is performed over macroblocks. At step 1215, syntax is parsed. At step 1220, a predictor of the current macroblock is obtained (for example, by calculating the predictor from neighboring reconstructed macroblocks, or from a block in a previous frame). At step 1225, a residue of the current block is calculated (for example, by performing inverse quantization and inverse transformation as shown in blocks 220 and 225 in FIG. 2). At step 1230, the residue is added to the predictor. At step 1235, the loop is terminated. At step 1240, deblock filtering is performed.

Experimental Results

At least some of the described distortion metrics and RD optimized mode selection schemes have been implemented based on, for these implementations, H.264/AVC (Joint Model (JM) reference software version 13.2), and verified by the experiments using various multi-view test sequences. In these particular tests, MPEG multi-view video test sequences are used to generate the depth map for each sequence using the well-known "Ballet" and "Breakdancers" sequences. Each sequence has different characteristics and camera settings, such as, for example, different amounts of texture and object edges, parallel or non-parallel camera arrangement, and/or small or large camera distance. These factors will affect the amount of geometry error caused from depth map distortions, which can be observed from the linear relationship as analyzed above.

In our simulations, in order to compare rendering results with ground truth (the captured view), we select the target view to be positioned at the same location of one of the captured views, and use two neighboring views (with respect to that captured view) and the corresponding depth maps as input for the View Synthesis Reference Software (VSRS) that is used to generate the rendered view. For example, we can render View 4 of the Ballet sequence using View 3 and View 5 as input. Since the target view is in the middle between the two reference views, to derive the geometry error from depth coding distortion, the distance between p and p' (which will be equal to Tp−Tp' from the earlier equations) is set to one camera distance (one baseline) in Equation (6). Both the input color video and the corresponding depth map are coded and decoded using the same quantization parameter.

Figure 13:
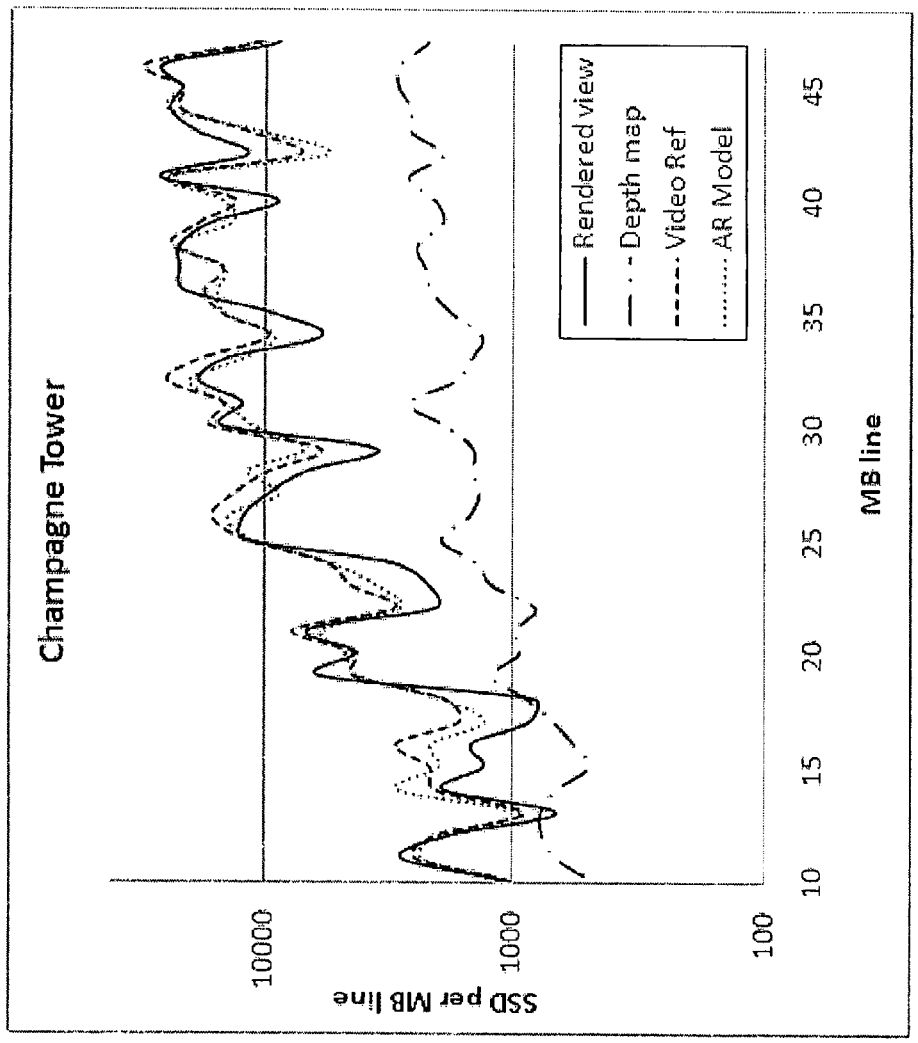
FIG. 13 shows a comparison of distortion in a rendered view, distortion in a compressed depth map, an estimation result using "Video REF", and an estimation result using "AR Model" for a video sequence depicting a champagne tower.
Figure 14:
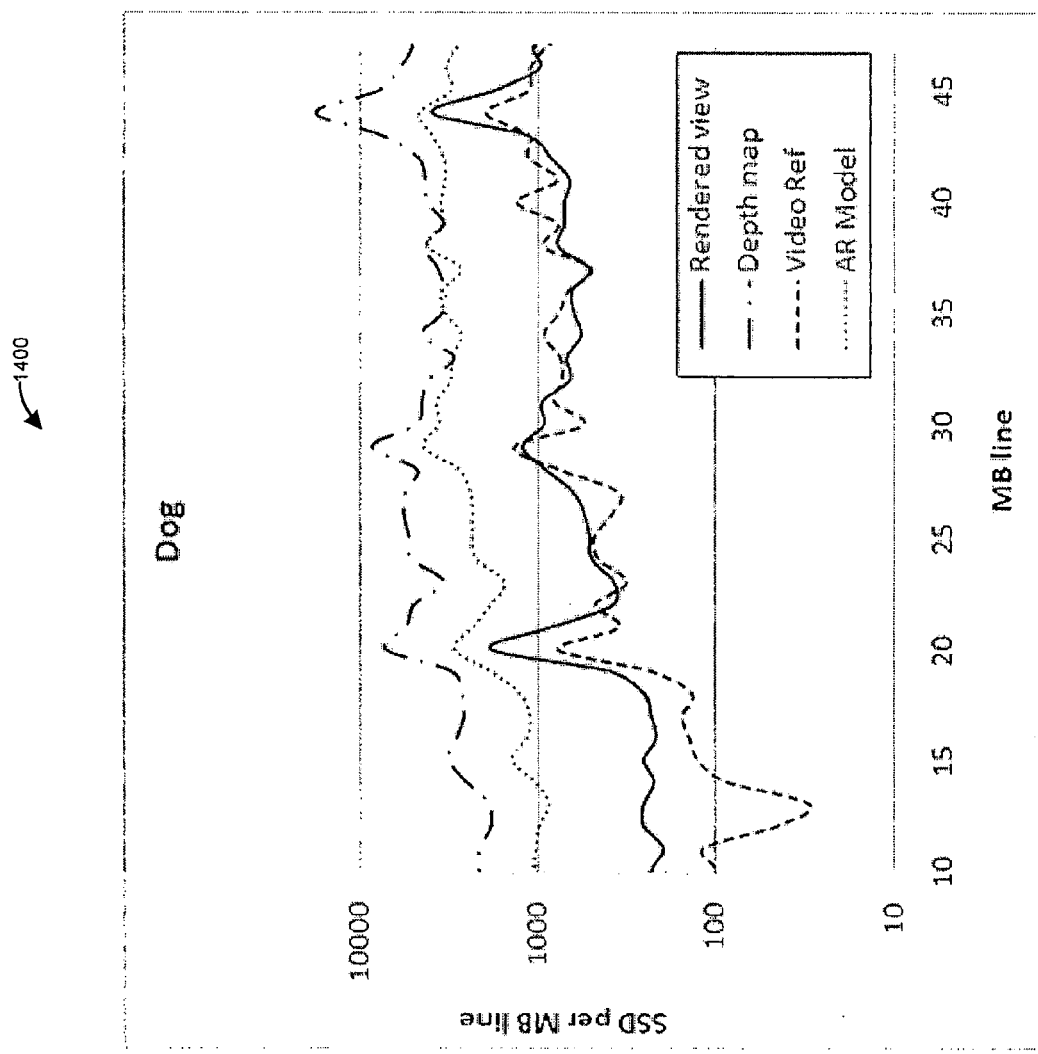
FIG. 14 shows a comparison of distortion in a rendered view, distortion in a compressed depth map, an estimation result using "Video REF", and an estimation result using "AR Model" for a video sequence depicting a dog.

First, to evaluate the accuracy of the proposed distortion estimation methods in this test environment and with these testing implementations, the new distortion metrics described herein, which are referred to as "Video Ref (Embodiment 1)" and "AR Model (Embodiment 2)" hereinafter, respectively, are compared to the actual distortion that occurred in the rendered view. Note that there are two sources of distortion in the rendered view, namely depth map distortion and rendering process. Since we want to consider only the effect from the depth map distortion, the actual distortion is calculated by generating the rendered view with and without coding the depth map and taking the sum of squared difference (SSD) between them for each macroblock (MB). FIG. 13 shows a comparison of distortion in a rendered view, distortion in a compressed depth map, an estimation result using "Video REF", and an estimation result using "AR Model" for a video sequence depicting a champagne tower, in accordance with an embodiment of the present principles. FIG. 14 shows a comparison of distortion in a rendered view, distortion in a compressed depth map, an estimation result using "Video REF", and an estimation result using "AR Model" for a video sequence depicting a dog, in accordance with an embodiment of the present principles. For better visualization, the SSD for each macroblock is accumulated for each macroblock row and plotted. The x-axis denotes the MB-line index, and the y-axis denotes the accumulated SSD for the MB-line expressed in a logarithmic scale. In FIG. 13, the depth map distortion is much smaller than that of the rendered view. On the other hand, it is the reverse case in FIG. 14. The reason is that the "Champagne Tower" captures a nearer scene than "Dog", which results in larger scaling factor in Equation (7), and consequently a larger geometry error. At the same time, the variance of the video of "Champagne Tower" is larger than that of "Dog". In both cases, the proposed methods more closely follow the actual distortion that occurred in the rendered view than the depth map distortion, that is, the proposed methods provide a more precise distortion estimation than using the distortion of the depth map. Further, "Video Ref", which estimates the rendering distortion by referencing the video with pixel by pixel geometry error, gives better results than "AR Model" which approximates the distortion with a global autoregressive model.

Figure 15:
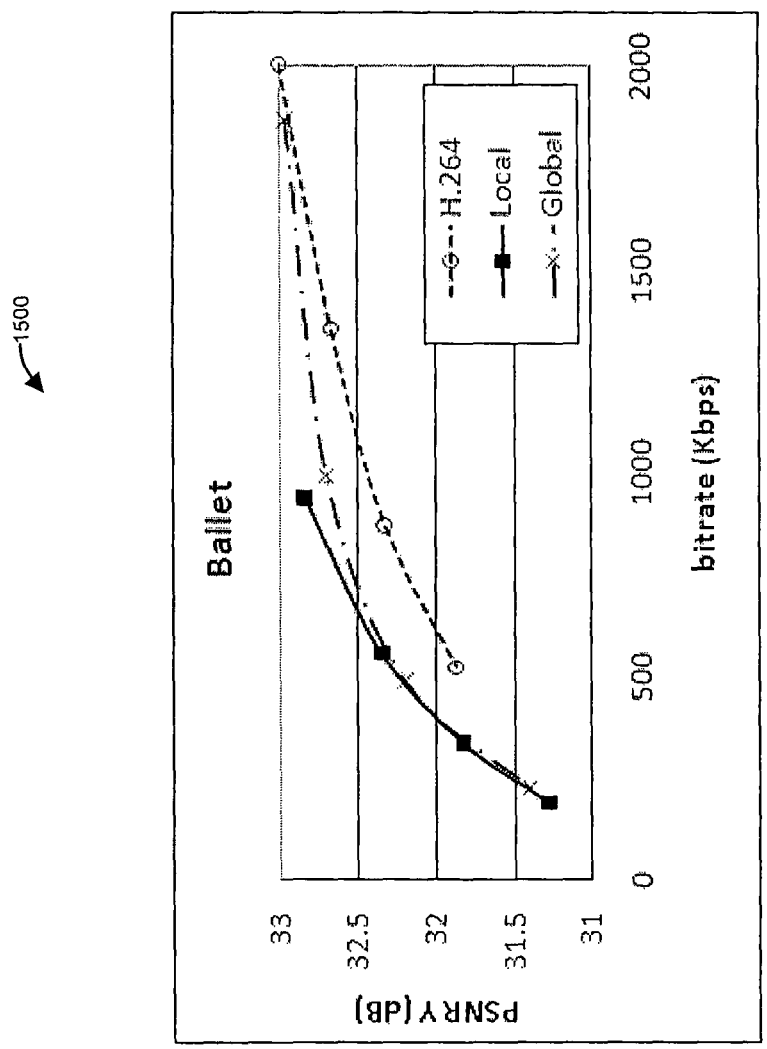
FIG. 15 shows a comparison between global estimation methods, and local distortion estimation methods relating to an embodiment of the present principles, when they are applied to a rate-distortion optimized mode selection scheme for a video sequence depicting a ballet.
Figure 16:
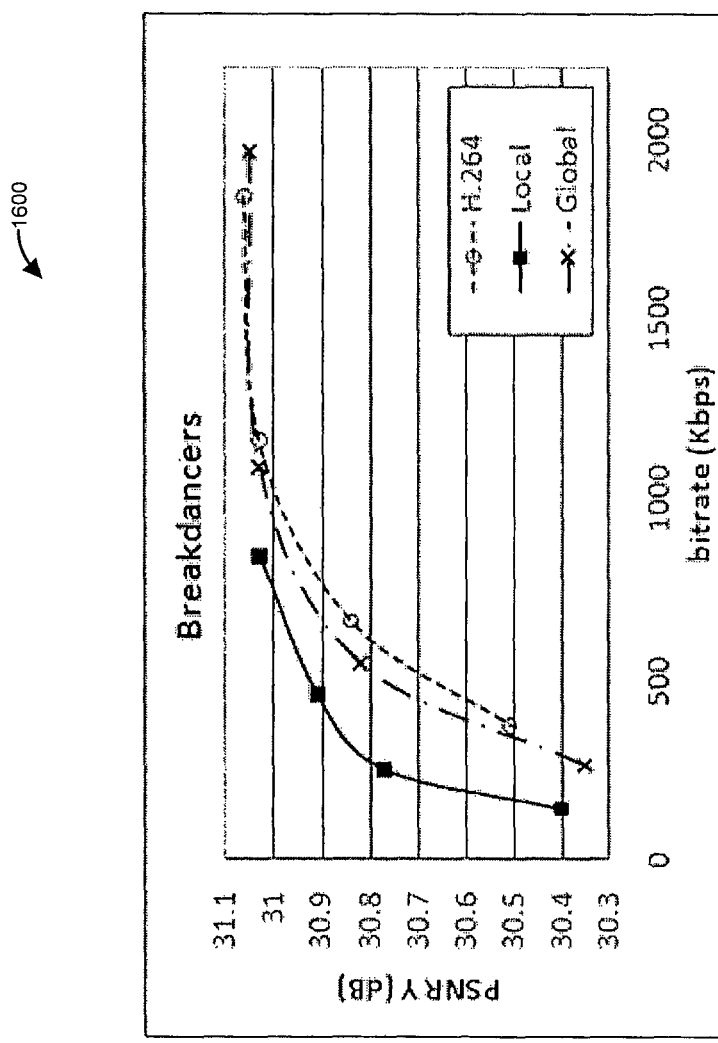
FIG. 16 shows a comparison between global estimation methods, and local distortion estimation methods relating to an embodiment of the present principles, when they are applied to a rate-distortion optimized mode selection scheme for a video sequence depicting breakdancers.

Secondly, the performance of the proposed distortion estimation method based on local video characteristics is compared to the one based on global video characteristics. In one approach that will be used as a comparison, the rendered view distortion is estimated using global video characteristics, in which the mapping from the geometry error to the rendered view distortion is determined using a global parameter calculated from a set of frames. However, local video characteristics can affect the rendered view distortion. For example, when a local area of a video frame includes complex texture, even a small amount of geometry error can cause a large distortion. On the other hand, geometry error would not result in much distortion in a flat region in a video frame. Since the proposed methods estimate the rendered view distortion for each pixel in "Video Ref (Embodiment 1)" and for each block in "AR Model (Embodiment 2)", the proposed methods can reflect local video characteristics very well. FIG. 15 shows a comparison between (1) global estimation methods, and (2) local distortion estimation methods relating to an embodiment of the present principles, when they are applied to a rate-distortion optimized mode selection scheme for a video sequence depicting a ballet. FIG. 16 shows a comparison between global estimation methods, and local distortion estimation methods relating to an embodiment of the present principles, when they are applied to a rate-distortion optimized mode selection scheme for a video sequence depicting breakdancers. In further detail, "Global" indicates the global estimation method, and "Local" is the local estimation method as proposed herein without applying the new Lagrange multiplier. Compared to H.264 where depth map distortion itself is used for mode decision, both global and local distortion estimation methods show good performance. In both test sequences, the local estimation method performs better than the global estimation method. Note that the performance gap between the local and global methods is larger in the "Breakdancers" sequence (FIG. 16) than in the "Ballet" sequence (FIG. 15). The former (FIG. 16) includes a complex scene with many objects and the scene in the latter (FIG. 15) is simple with flat regions in the background. Therefore, the global estimation can work closely to the local method in the latter case (FIG. 15), while the local method can work significantly better when the video includes a complex scene as in the former case (FIG. 16).

Figure 17:
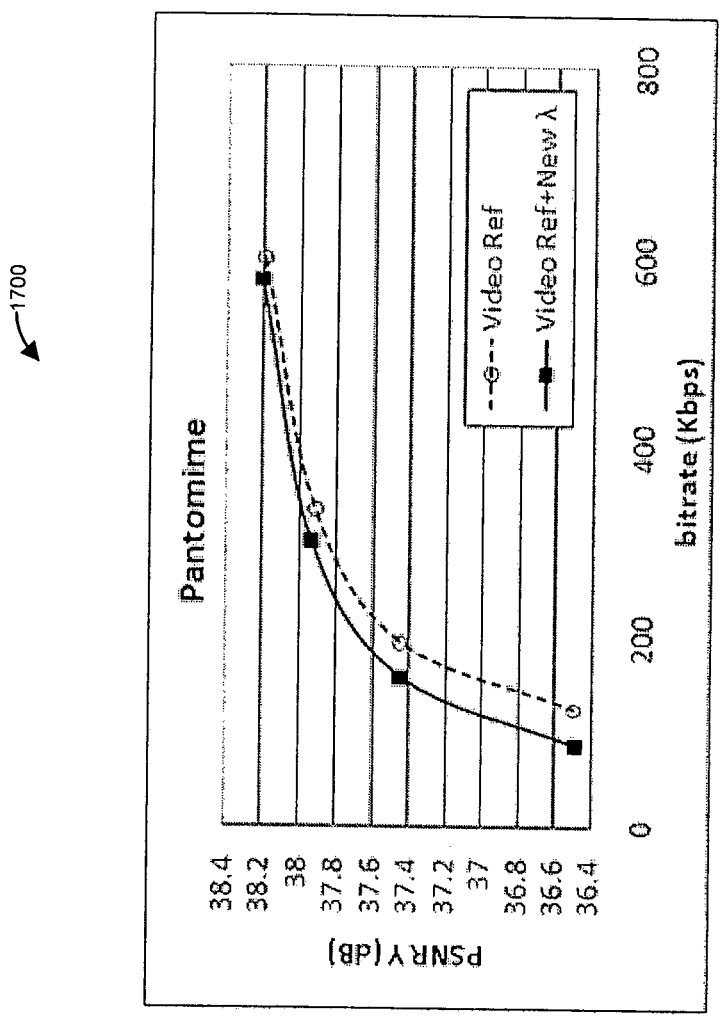
FIG. 17 shows the rate-distortion performances of the proposed methods with and without the new Lagrange multiplier for a video sequence depicting a pantomime.
Figure 18:
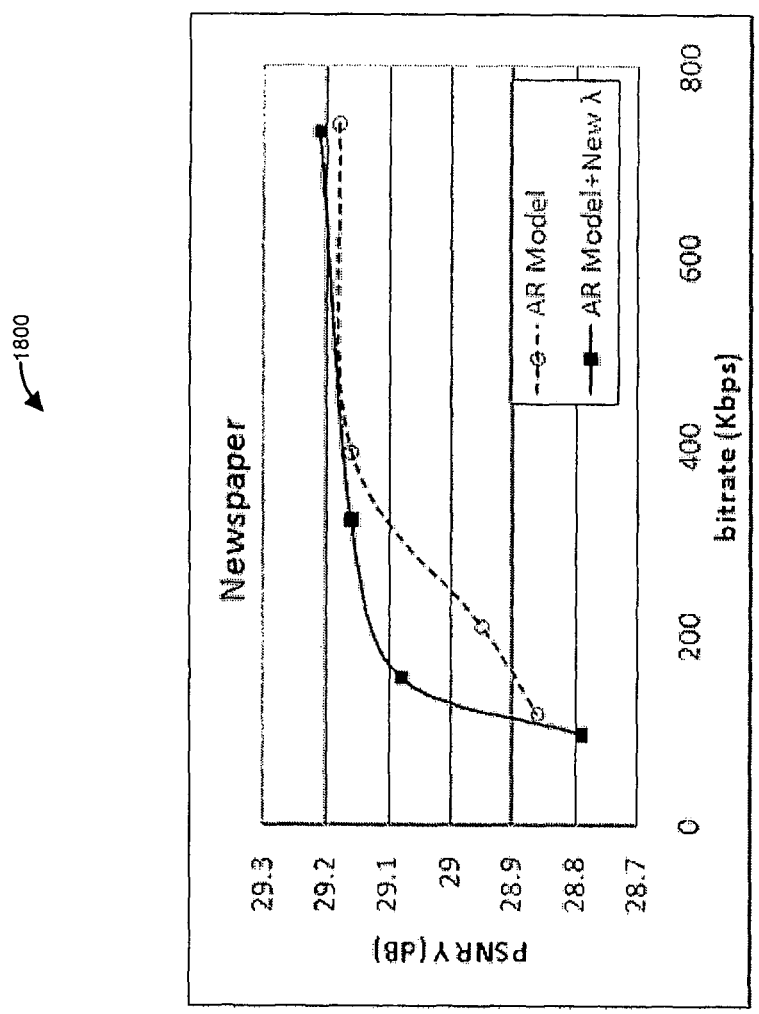
FIG. 18 shows the rate-distortion performances of the proposed methods with and without the new Lagrange multiplier for a video sequence depicting a newspaper.

Thirdly, the new Lagrange multiplier derived herein is applied along with the new distortion metrics to the RD optimized mode selection. To generate RD curves, two sets of video and depth maps are coded using the same quantization parameter values. Then, using the decoded video and depth map, an intermediate view is rendered, can be compared with the ground truth (the captured view) to generate the peak signal to noise ratio (PSNR) of the luminance component to be plotted as the y-axis in FIGS. 17 and 18. FIG. 17 shows the rate-distortion performances of the proposed methods with and without the new Lagrange multiplier for a video sequence depicting a pantomime. FIG. 18 shows the rate-distortion performances of the proposed methods with and without the new Lagrange multiplier for a video sequence depicting a newspaper. The x-axis is the total bitrate to code two depth maps. FIG. 17 is for "Video Ref (Embodiment 1)" and FIG. 18 is for "AR Model (Embodiment 2)", where RD curves are generated with and without the new Lagrange multiplier. For both methods, the new Lagrange multiplier improved the coding efficiency.

Figure 19:
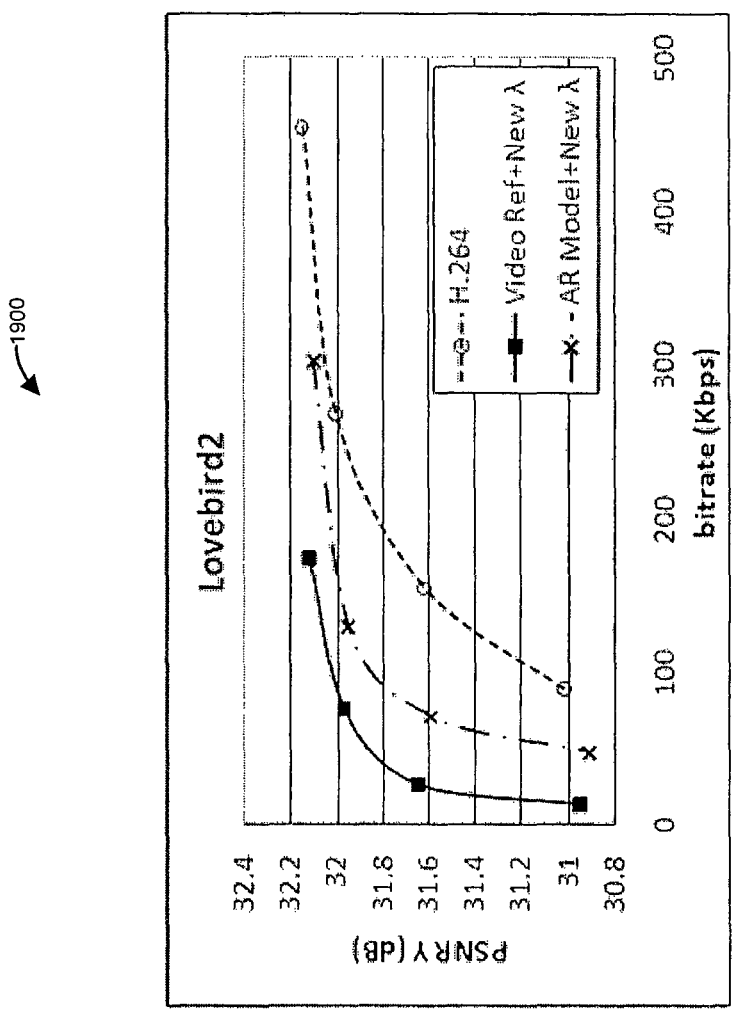
FIG. 19 shows the rate-distortion performances between the proposed methods and H.264 for a video sequence depicting a lovebird.
Figure 20:
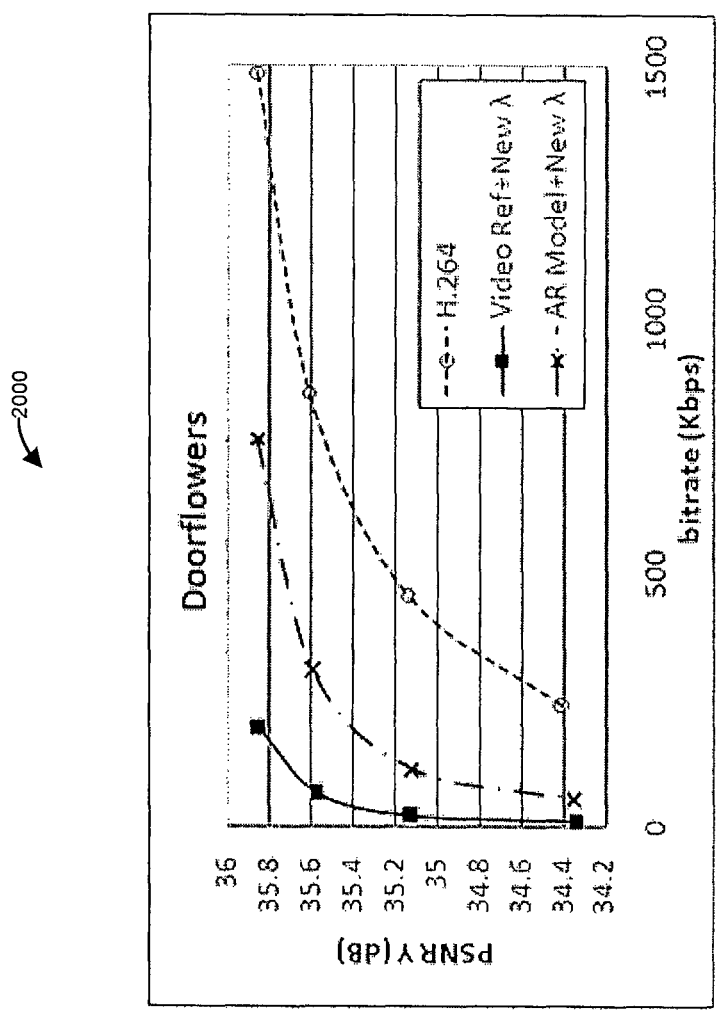
FIG. 20 shows the rate-distortion performances between the proposed methods and H.264 for a video sequence depicting doorflowers.

FIG. 19 shows the rate-distortion performances between the proposed methods and H.264 for a video sequence depicting a lovebird. FIG. 20 shows the rate-distortion performances between the proposed methods and H.264 for a video sequence depicting doorflowers. The BD-PSNR and BD-bitrate between the proposed methods and H.264 are calculated using various multi-view sequences, which are listed in TABLE 1. On average, a 0.6 dB BD-PSNR improvement or 70% bitrate saving is observed by "Video Ref", and 0.25 dB and 35% by "AR Model".

TABLE 1

|  | Method 1 | | Method 2 | |
| --- | --- | --- | --- | --- |
|  | BD-PSNR (dB) | BD-bitrate (%) | BD-PSNR (dB) | BD-bitrate (%) |
| Dog | 0.56 | 61.84 | 0.32 | 45.53 |
| Lovebird 1 | 0.28 | 71.86 | 0.01 | −21.80 |
| Lovebird 2 | 0.65 | 81.98 | 0.34 | 44.85 |
| Doorflowers | 1.64 | 94.29 | 0.64 | 72.16 |
| Newspaper | 0.22 | 78.86 | 0.10 | 37.88 |
| Pantomime | 0.54 | 49.84 | 0.14 | 19.38 |
| Ballet | 0.57 | 51.98 | 0.30 | 27.12 |
| Breakdancers | 0.14 | 64.77 | 0.12 | 54.94 |
| Average | 0.58 | 69.43 | 0.25 | 35.01 |

We thus provide one or more implementations having particular features and aspects. However, features and aspects of described implementations may also be adapted for other implementations.

For example, several of the implementations and features described in this application may be used in the context of depth coding. However, these implementations and features may be used in the context of coding video and/or coding other types of data. Additionally, these implementations and features may be used in the context of, or adapted for use in the context of, the H.264/MPEG-4 AVC (AVC) Standard, the AVC standard with the MVC extension, the AVC standard with the SVC extension, a 3DV standard, and/or with another standard (existing or future), or in a context that does not involve a standard.

Additionally, other measures of distortion may be used, as well as other manners of calculating or estimating distortion. Further, implementations may signal information using a variety of techniques including, but not limited to, SEI messages, slice headers, other high level syntax, non-high-level syntax, out-of-band information, datastream data, and implicit signaling. Accordingly, although implementations described herein may be described in a particular context, such descriptions should in no way be taken as limiting the features and concepts to such implementations or contexts.

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer, for example, to all or part (a portion) of a still image or all or part (a portion) of a picture from a video sequence. More generally, a picture refers, for example, to any set of image or video data. A picture may be, for example, a pixel, a macroblock, a slice, a frame, a field, a full picture, a region bounding an object in the picture, the foreground of the picture, the background of the picture, or a particular set of (x,y) coordinates in the picture. Similarly, a "portion" of a picture may be, for example, a pixel, a macroblock, a slice, a frame, a field, a region bounding an object in the picture, the foreground of the picture, the background of the picture, or a particular set of (x,y) coordinates in the picture. As another example, a depth picture may be, for example, a complete depth map or a partial depth map that only includes depth information for, for example, a single macroblock of a corresponding video frame.

Additionally, this application or its claims may refer to "determining" various pieces of information. Determining the information may include one or more of, for example, estimating the information, calculating the information, predicting the information, or retrieving the information from memory.

Similarly, "accessing" is intended to be a broad term. Accessing a piece of information may include any operation that, for example, uses, stores, sends, transmits, receives, retrieves, modifies, or provides the information.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure and are within the scope of this disclosure.

The invention claimed is:

1. A method comprising:
accessing a depth picture that has depth values for a video picture from a particular view, wherein the depth picture is capable of being used to render a video picture for a different view than the particular view to produce a rendered video picture;
determining a depth coding rate that results from coding at least a portion of the depth picture using a particular coding mode;
determining a value of depth distortion that results from coding at least the portion of the depth picture using the particular coding mode;
determining, based on the value of depth distortion, a value for a correlation coefficient between at least a portion of a specific video picture and a translated version of the portion of the specific video picture, wherein the specific video picture is one or more of the video picture from the particular view or the rendered video picture;
determining a value of video distortion, for one or more of at least a portion of the video picture from the particular view or at least a portion of the rendered video picture, based on the value for the correlation coefficient; and
determining whether to use the particular coding mode to code at least the portion of the depth picture based on the value of video distortion and the depth coding rate.

2. The method of claim 1 wherein determining the value for the correlation coefficient comprises estimating the value of the correlation coefficient using an auto-regressive model of correlation.

3. The method of claim 1 further comprising determining a translation error, for one or more of at least the portion of the video picture from the particular view or at least the portion of the rendered video picture, resulting from the value of the depth distortion.

4. The method of claim 3 wherein determining the value for the correlation coefficient comprises estimating the value of the correlation coefficient using an auto-regressive model of correlation that is based on the translation error.

5. The method of claim 4 wherein estimating the value of the correlation coefficient using the auto-regressive model comprises:

determining a correlation component that is based on a particular translation of at least the portion of the video picture, and
raising the correlation component to a power that is based on the translation error.

6. The method of claim 5 wherein determining the correlation component comprises accessing a stored value for the correlation component.

7. The method of claim 3 wherein the translation error is an average translation error for one or more of at least the portion of the video picture from the particular view or at least the portion of the rendered video picture.

8. The method of claim 1 wherein the value of video distortion is also based on a variance of one or more of at least the portion of the video picture from the particular view or at least the portion of the rendered video picture.

9. The method of claim 1 wherein determining whether to use the particular coding mode to code at least the portion of the depth picture comprises:
determining a multiplier based on pixel values from one or more of at least the portion of the video picture from the particular view or at least the portion of the rendered video picture;
determining a cost for the particular coding mode based on the depth coding rate and the value of video distortion, wherein the value of the depth coding rate is multiplied by the multiplier; and
determining whether to use the particular coding mode, to code at least the portion of the depth picture, based on the cost.

10. The method of claim 9 wherein determining the multiplier comprises determining the multiplier based on one of more criteria from a group consisting of a variance of at least the portion of the video picture, a variance of at least the portion of the depth picture, a variance of at least the portion of the rendered video picture, a camera parameter, a correlation component that is based on a particular translation of at least the portion of the video picture, a quantization step size, a rate resulting from using the particular coding mode to code at least the portion of the depth picture, or a distortion in at least the portion of the depth picture that results from using the particular coding mode to code at least the portion of the depth picture.

11. The method of claim 9 wherein determining the multiplier comprises determining a value for a correlation coefficient between at least a portion of a specific video picture and a translated version of the portion of the specific video picture, wherein the specific video picture is one or more of the video picture from the particular view or the rendered video picture.

12. The method of claim 11 wherein determining the value for the correlation coefficient comprises estimating the value of the correlation coefficient using an auto-regressive model of correlation.

13. The method of claim 9 further comprising determining a translation error, for one or more of at least the portion of the video picture from the particular view or at least the portion of the rendered video picture, resulting from the value of the depth distortion.

14. The method of claim 13 wherein determining the translation error is based on a quantization step size of at least the portion of the depth picture.

15. The method of claim 11 wherein determining the value for the correlation coefficient comprises estimating the value of the correlation coefficient using an auto-regressive model of correlation that is based on the translation error.

16. The method of claim 14 wherein estimating the value of the correlation coefficient using the auto-regressive model comprises:
  determining a correlation component that is based on a particular translation of at least a portion of a video picture, and
  raising the correlation component to a power that is based on the translation error.

17. The method of claim 9 wherein determining the multiplier comprises determining a variance of one or more of at least the portion of the video picture from the particular view or at least the portion of the rendered video picture.

18. The method of claim 9 wherein determining the multiplier comprises determining a variance of at least the portion of the depth picture.

19. The method of claim 9 wherein determining the multiplier comprises determining a quantization step size of at least the portion of the depth picture.

20. An apparatus comprising:
  means for accessing a depth picture that has depth values for a video picture from a particular view, wherein the depth picture is capable of being used to render a video picture for a different view than the particular view to produce a rendered video picture;
  means for determining a depth coding rate that results from coding at least a portion of the depth picture using a particular coding mode;
  means for determining a value of depth distortion that results from coding at least the portion of the depth picture using the particular coding mode;
  means for determining, based on the value of depth distortion, a value for a correlation coefficient between at least a portion of a specific video picture and a translated version of the portion of the specific video picture, wherein the specific video picture is one or more of the video picture from the particular view or the rendered video picture;
  means for determining a value of video distortion, for one or more of at least a portion of the video picture from the particular view or at least a portion of the rendered video picture, based on the value for the correlation coefficient; and
  means for determining whether to use the particular coding mode to code at least the portion of the depth picture based on the value of video distortion and the depth coding rate.

21. A non transitory processor readable medium having stored thereon instructions for causing a processor to perform at least the following:
  accessing a depth picture that has depth values for a video picture from a particular view, wherein the depth picture is capable of being used to render a video picture for a different view than the particular view to produce a rendered video picture;
  determining a depth coding rate that results from coding at least a portion of the depth picture using a particular coding mode;
  determining a value of depth distortion that results from coding at least the portion of the depth picture using the particular coding mode;
  determining, based on the value of depth distortion, a value for a correlation coefficient between at least a portion of a specific video picture and a translated version of the portion of the specific video picture, wherein the specific video picture is one or more of the video picture from the particular view or the rendered video picture;
  determining a value of video distortion, for one or more of at least a portion of the video picture from the particular view or at least a portion of the rendered video picture, based on the value for the correlation coefficient; and
  determining whether to use the particular coding mode to code at least the portion of the depth picture based on the value of video distortion and the depth coding rate.

22. An apparatus, comprising a processor configured to perform at least the following:
  accessing a depth picture that has depth values for a video picture from a particular view, wherein the depth picture is capable of being used to render a video picture for a different view than the particular view to produce a rendered video picture;
  determining a depth coding rate that results from coding at least a portion of the depth picture using a particular coding mode;
  determining a value of depth distortion that results from coding at least the portion of the depth picture using the particular coding mode;
  determining, based on the value of depth distortion, a value for a correlation coefficient between at least a portion of a specific video picture and a translated version of the portion of the specific video picture, wherein the specific video picture is one or more of the video picture from the particular view or the rendered video picture;
  determining a value of video distortion, for one or more of at least a portion of the video picture from the particular view or at least a portion of the rendered video picture, based on the value for the correlation coefficient; and
  determining whether to use the particular coding mode to code at least the portion of the depth picture based on the value of video distortion and the depth coding rate.

23. An apparatus comprising an encoder for performing at least the following operations:
  accessing a depth picture that has depth values for a video picture from a particular view, wherein the depth picture is capable of being used to render a video picture for a different view than the particular view to produce a rendered video picture;
  determining a depth coding rate that results from coding at least a portion of the depth picture using a particular coding mode;
  determining a value of depth distortion that results from coding at least the portion of the depth picture using the particular coding mode;
  determining, based on the value of depth distortion, a value for a correlation coefficient between at least a portion of a specific video picture and a translated version of the portion of the specific video picture, wherein the specific video picture is one or more of the video picture from the particular view or the rendered video picture;
  determining a value of video distortion, for one or more of at least a portion of the video picture from the particular view or at least a portion of the rendered video picture, based on the value for the correlation coefficient; and
  determining whether to use the particular coding mode to code at least the portion of the depth picture based on the value of video distortion and the depth coding rate.

24. The apparatus of claim 23 wherein the encoder comprises:
  a video parameter calculator for determining, based on the value of depth distortion, the value for the correlation coefficient; and
  a mode decision module for determining the depth coding rate, and for determining the value of depth distortion, and for determining the value of video distortion, and for determining whether to use the particular coding mode.

25. An apparatus comprising:
an encoder for performing at least the following operations:
  accessing a depth picture that has depth values for a video picture from a particular view, wherein the depth picture is capable of being used to render a video picture for a different view than the particular view to produce a rendered video picture,
  determining a depth coding rate that results from coding at least a portion of the depth picture using a particular coding mode,
  determining a value of depth distortion that results from coding at least the portion of the depth picture using the particular coding mode,
  determining, based on the value of depth distortion, a value for a correlation coefficient between at least a portion of a specific video picture and a translated version of the portion of the specific video picture, wherein the specific video picture is one or more of the video picture from the particular view or the rendered video picture,
  determining a value of video distortion, for one or more of at least a portion of the video picture from the particular view or at least a portion of the rendered video picture, based on the value for the correlation coefficient, and
  determining whether to use the particular coding mode to code at least the portion of the depth picture based on the value of video distortion and the depth coding rate; and
a modulator for modulating a signal that includes an encoding of one or more portions of the depth picture from the particular view.

26. A method comprising:
accessing a depth picture that has depth values for a video picture from a particular view wherein the depth picture is capable of being used to render a video picture for a different view than the particular view to produce a rendered video picture;
determining a depth coding rate that results from coding at least a portion of the depth picture using a particular coding mode;
determining a value of depth distortion that results from coding at least the portion of the depth picture using the particular coding mode;
determining a value of video distortion, for one or more of at least a portion of the video picture from the particular view or at least a portion of the rendered video picture, based on the value of the depth distortion;
determining a multiplier based on pixel values from one or more of at least the portion of the video picture from the particular view or at least the portion of th rendered video picture and determining, based on the value of depth distortion, a value for a correlation coefficient between at least a portion of a specific video picture and a translated version of the portion of the specific video picture, wherein the specific video picture is one or more of the video picture from the particular view or the rendered video picture;
determining a cost for the particular coding mode based on the depth coding rate and the value of video distortion, wherein the value of the depth coding rate is multiplied by the multiplier; and
determining whether to use the particular coding mode, to code at least the portion of the depth picture, based on the cost.

* * * * *